(12) United States Patent
Samalot et al.

(10) Patent No.: US 12,296,543 B2
(45) Date of Patent: May 13, 2025

(54) METHOD AND APPARATUS FOR CONTROLLING INDUCTION WELDING

(71) Applicant: The Boeing Company, Chicago, IL (US)

(72) Inventors: Francis J. Samalot, St. Louis, MO (US); Pedro P. Martin, Madrid (ES); Yannick Buser, Overijssel (NL)

(73) Assignee: The Boeing Company, Arlington, VA (US)

( * ) Notice: Subject to any disclaimer, the term of this patent is extended or adjusted under 35 U.S.C. 154(b) by 445 days.

(21) Appl. No.: 17/585,495

(22) Filed: Jan. 26, 2022

(65) Prior Publication Data

US 2022/0242059 A1    Aug. 4, 2022

Related U.S. Application Data

(60) Provisional application No. 63/143,621, filed on Jan. 29, 2021.

(51) Int. Cl.
| | | |
|---|---|---|
| *B29C 65/00* | (2006.01) | |
| *B29C 65/32* | (2006.01) | |
| *B64F 5/10* | (2017.01) | |
| *G05B 19/401* | (2006.01) | |
| *H05B 6/06* | (2006.01) | |
| *H05B 6/10* | (2006.01) | |

(52) U.S. Cl.
CPC ........ *B29C 66/91655* (2013.01); *B29C 65/32* (2013.01); *B64F 5/10* (2017.01); *G05B 19/4015* (2013.01); *H05B 6/06* (2013.01); *H05B 6/10* (2013.01); *G05B 2219/45135* (2013.01)

(58) Field of Classification Search
CPC ........ B29C 66/00–91655; B29C 65/32; B29C 65/36; H05B 6/06; H05B 6/10; G05B 2219/45135; G05B 19/4015; B29L 2031/3076
See application file for complete search history.

(56) References Cited

U.S. PATENT DOCUMENTS

| | | | | |
|---|---|---|---|---|
| 6,455,825 B1* | 9/2002 | Bentley | ................. | G05D 23/26 |
| | | | | 148/567 |
| 2010/0047609 A1* | 2/2010 | Kawabata | ................. | C21D 9/50 |
| | | | | 428/603 |

(Continued)

FOREIGN PATENT DOCUMENTS

EP    3 017 931    5/2016

OTHER PUBLICATIONS

European Patent Office, Extended European Search Report, App. No. 21382078.0 (Jul. 19, 2021).

*Primary Examiner* — Mong-Shune Chung
(74) *Attorney, Agent, or Firm* — Walters & Wasylyna LLC

(57) ABSTRACT

A method is provided for controlling an induction welding operation. The method includes sweeping electrical current through an induction welding coil at an initial position of the induction welding coil along a weld path of a material; monitoring a response of the material to the swept electrical current using at least one electromagnetic field (EMF) sensor; calibrating an electrical current value for the induction welding operation using the monitored response; and performing the induction welding operation along the weld path using the calibrated electrical current value.

38 Claims, 16 Drawing Sheets

(56) References Cited

U.S. PATENT DOCUMENTS

| | | | | |
|---|---|---|---|---|
| 2010/0258535 A1* | 10/2010 | Fukutani | ............... | B23K 13/025 |
| | | | | 138/171 |
| 2012/0006810 A1* | 1/2012 | Fan | ......................... | B29C 66/43 |
| | | | | 219/617 |
| 2021/0291292 A1* | 9/2021 | Seneviratne | ............ | B23K 13/02 |
| 2022/0410500 A1* | 12/2022 | Philippe | ............... | B29C 65/1432 |

* cited by examiner

METHOD AND APPARATUS FOR CONTROLLING INDUCTION WELDING

CROSS-REFERENCE TO RELATED APPLICATION

This application claims the benefit of and priority to U.S. Provisional Application No. 63/143,621, entitled "METHOD AND APPARATUS FOR CONTROLLING INDUCTION WELDING", filed Jan. 29, 2021, which is incorporated by reference herein in its entirety.

BACKGROUND

Induction welding uses electromagnetic induction to heat objects without contacting the surface of the objects. For example, two objects can be welded together at a joint by induction welding and neither object is contacted by the induction welding coil itself. In some induction welding systems, a current-temperature relationship for a given object configuration is used to select an electrical current value to target a predetermined welding temperature that is sufficient to obtain a successful joint. However, variances (e.g., material variances, fabrication process variances, etc.) between different batches of the same configuration may affect the current-temperature relationship and thereby the electrical current value required to achieve the predetermined welding temperature. In some welding operations, variances between different batches of the same configuration are overcome by performing a witness weld for each joint on a witness panel and adjusting the value of the electrical current based on the witness panel. However, creating witness panels is time consuming and costly.

Therefore, it would be desirable to have a method and apparatus that accounts for at least some of the issues discussed above, as well as other possible issues.

SUMMARY

In one aspect, a method is provided for controlling an induction welding operation. The method includes sweeping electrical current through an induction welding coil at an initial position of the induction welding coil along a weld path of a material; monitoring a response of the material to the swept electrical current using at least one electromagnetic field (EMF) sensor; calibrating an electrical current value for the induction welding operation using the monitored response; and performing the induction welding operation along the weld path using the calibrated electrical current value.

In another aspect, a computer program product, including a computer storage medium having a computer readable program code embodied therein, is provided. The computer readable program code is adapted to be executed, to implement a method for controlling induction welding including sweeping electrical current through an induction welding coil at an initial position of the induction welding coil along a weld path of a material; monitoring a response of the material to the swept electrical current using at least one electromagnetic field (EMF) sensor; calibrating an electrical current value for the induction welding operation using the monitored response; and performing the induction welding operation along the weld path using the calibrated electrical current value.

In another aspect, an apparatus for induction welding is provided. The apparatus includes an end effector including an induction welding coil that generates a magnetic field. The magnetic field causing a weld path of a material to generate heat resulting in induction welding. The apparatus further includes an electromagnetic field (EMF) sensor that measures a magnetic field intensity at an initial position of the induction welding coil along the weld path of the material. The apparatus further includes a controller configured to: sweep electrical current through the induction welding coil at the initial position of the induction welding coil along the weld path; monitor a response of the material to the swept electrical current using the EMF sensor; and calibrate an electrical current value for the induction welding operation using the monitored response.

In another aspect, a method is provided for controlling an induction welding operation. The method includes sweeping electrical current through an induction welding coil at an initial position of the induction welding coil along a weld path of a material of a first batch, wherein the electrical current is swept through the induction welding coil to a value that is less than a value of the swept electrical current that induces a calibration weld temperature; monitoring a response of the material to the swept electrical current using at least one electromagnetic field (EMF) sensor; calibrating an electrical current value for the induction welding operation using the monitored response before a weld is generated on any material of the first batch; and performing the induction welding operation along the weld path using the calibrated electrical current value.

DETAILED DESCRIPTION

Figure 1:
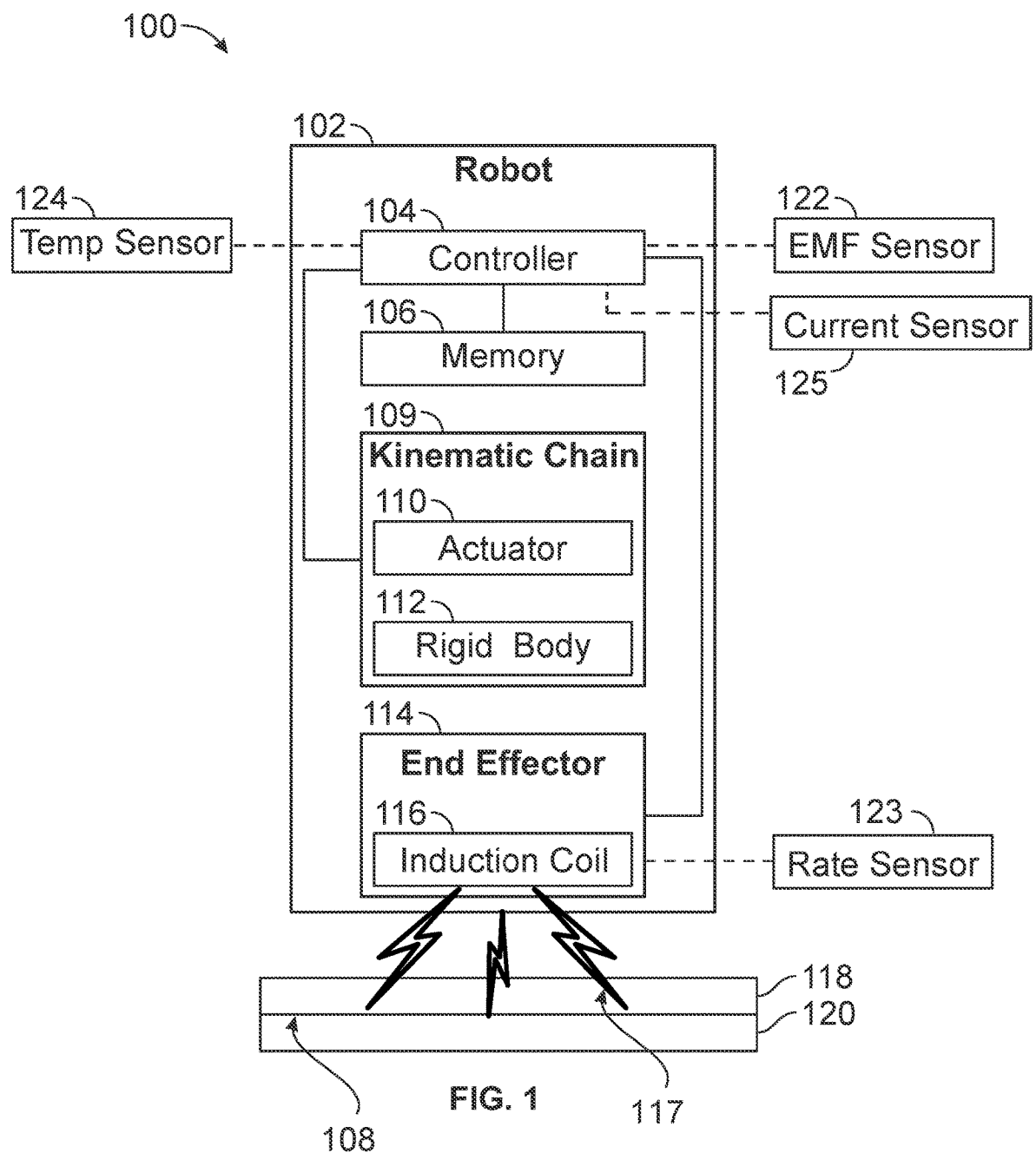
FIG. 1 illustrates an induction welding system, in accordance with an implementation.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation", "an implementation", "one example", "an example", etc. are not intended to be interpreted as excluding the existence of additional implementations and/or examples that also incorporate the recited features. Moreover, unless explicitly stated to the contrary, implementations "comprising" or "having" an element or a plurality of elements having a particular property can include additional elements not having that property.

Implementations of the disclosure include methods and apparatus for controlling induction welding operations. These implementations provide for sweeping electrical current through an induction welding coil at an initial position of the induction welding coil along a weld path of a material; monitoring a response of the material to the swept electrical current using at least one EMF sensor; calibrating an electrical current value for the induction welding operation using the monitored response; and performing the induction welding operation along the weld path using the calibrated electrical current value.

Implementations of the present disclosure provide methods and system that operate in an unconventional manner to calibrate the electrical current for an induction welding operation. Implementations of the present disclosure have a technical effect of reduced production time, reduced production costs, and improved operation of a computer, for example providing a more efficient and directed accounting of the variability of the electrical current setting caused by variances between different batches of the same configuration, improving the efficiency of computational hardware (e.g., as compared to traditional induction welding systems etc.), etc. The implementations disclosed herein improve overall autonomous system operation and reliability of induction welding systems.

Induction welding is sometimes accomplished by establishing heating surveys with set-up welds and thermocouples in the weld line for a given configuration of the objects being welded. The heating surveys generate a current-temperature relationship for the object configuration. The current-temperature relationship is used to select an electrical current value to target a predetermined welding temperature that is sufficient to obtain a successful joint. The current-temperature relationship is affected by various variables (e.g., materials, layup, manufacturing history, geometry, overlap region, tooling, etc.), which in turn determines the electrical current, pressure, and speed required to obtain a successful joint. The welding speed and pressure are well understood and can be kept constant for a given configuration once established. Most of the variables affecting the current-temperature relationship are constant or the variability effect insignificant. Nonetheless, it has been shown that the variances (e.g., material variances, fabrication process variances, etc.) between different batches of the same configuration may significantly affect the current-temperature relationship and thereby the electrical current value required to achieve the predetermined welding temperature.

One method of overcoming the variability of the electrical current setting caused by variances between different batches of the same configuration is to establish a process window that accommodates the variances. Avoiding exceeding the process window upper temperature limit and constraining the heat affected zone is accounted for in the tooling configuration. However, this solution increases tooling costs and complexity because it extends the area of part that must be pressurized. In addition, extensive testing is required to establish the desired process capability index for all potential material and process variances. Another method of overcoming the variability of the electrical current setting caused by variances between different batches of the same configuration is performing a witness weld for each joint on a witness panel and adjusting the value of the electrical current based on the witness panel. However, both of these methods are time consuming and costly.

Implementations of the present disclosure are able to calibrate weld parameters to account for batch variations prior to the induction welding process. For example, the implementations disclosed herein establish the current-temperature response using EMF sensors sensibility to batch to batch variances. As the EMF sensor response is independent of the welding speed and at zero current there is negligible sensor response, a current sweep from room temperature to a temperature below a calibration weld temperature is performed to account for batch variability in the temperature to current calibration. In other words, the EMF sensors generate a material response at a temperature below the calibration weld temperature by sweeping the electrical current from zero to a value where coil current induces a temperature below the calibration weld temperature. The current sweep is performed with the induction welding coil at an initial position (i.e., a starting position, weld length=0, etc.) along the weld path. Accordingly, the implementations disclosed herein enable calibration (e.g. prediction, etc.) of the electrical current that is required to reach the predetermined welding temperature before the induction welding coil moves over the desired position of the weld. In some implementations, the responses of previous welds performed on other batches of the object configuration are stored in a database, which is further used to optimize the calibration of the electrical current that targets the predetermined welding temperature. Moreover, some implementations of the present disclosure measure the welding temperature as the weld progresses and adjust the electrical current during the weld based on the feedback of the measured welding temperatures, for example to account for variations (e.g., in thickness, geometry, welding speed, etc.) of the object along the weld path.

Various implementations disclosed herein use the objects to be welded and EMF sensors to obtain the current-temperature response of the material more quickly, without creating a weld, prior to creating a weld, without undesirably altering the objects to be welded, and/or without damaging the objects to be welded, for example as compared to at least some known methods for accounting for variations between different batches of the same configuration. For example, by sweeping the electrical current through the induction welding coil at the initial position of the induction welding coil along the weld path and using the material response thereto to calibrate the electrical current required to reach the predetermined welding temperature, implementations disclosed herein: (1) eliminate the need to establish costly and time-consuming process windows; (2) eliminate the use of costly and time-consuming witness panels and other calibration welds that are performed at a temperature below the predetermined welding temperature; and (3) reduce the time required to calibrate the electrical current required to reach the predetermined welding temperature. Accordingly, various implementations of the present disclosure reduce production time and reduce production costs. Moreover, various implementations of the present disclosure provide improved operation of a computer, for example by providing a more efficient and directed accounting of the variability of the electrical current setting caused by variances between different batches of the same configuration, by improving the efficiency of computational hardware (e.g., as compared to traditional induction welding systems etc.), etc. The implementations disclosed herein may be performed manually by a human operator, semi-autonomously using both a computing device and a human operator, or fully autonomously using a computing device. Semi-autonomous and fully autonomous implementations of the present disclosure improve overall autonomous system operation and reliability of induction welding systems.

FIG. 1 illustrates a block diagram of an induction welding system 100 according to an implementation of the present disclosure. The induction welding system 100 can perform induction welding, for example as described in the operation process flows 400, 500, and 600 illustrated in FIGS. 4-6, respectively, and the methods 700, 800, and 900 illustrated in FIGS. 7-9, respectively. The induction welding system 100, for example, can be implemented, in whole or in part, in the induction welding configuration 200 illustrated in FIG. 2. The induction welding system 100 shown in FIG. 1 is for illustration only. Other implementations of the induction welding system 100 can be used without departing from the scope of the present disclosure. That is, the present disclosure contemplates induction welding systems 100 having different shapes, sizes, arrangements, configurations, functionality, and/or the like. The induction welding system 100 may be referred to herein as an "apparatus for induction welding".

In the example of FIG. 1, the induction welding system 100 includes a robot 102 that includes a controller 104 and a memory 106 for managing the operations of a kinematic chain 109 comprising one or more actuators 110 and one or more rigid bodies 112. By controlling the motions of the kinematic chain 109, the position, speed, and/or direction of an end effector 114 bearing an induction welding coil 116 may be adjusted. The controller 104 controls an amount of electrical current (i.e., an electrical current value) applied to the induction welding coil 116 to increase or decrease a magnetic field 117 generated by the induction welding coil 116. The amount of electrical current applied to the induction welding coil 116 in turn controls a temperature of a weld interface 108 between components 118 and 120 (also shown in FIG. 2) being inductively welded together. The controller 104 can be implemented, for example, as custom circuitry, as a hardware processor executing programmed instructions, a combination thereof, etc. The controller 104 can direct the operations of the various components of the robot 102, for example in accordance with instructions stored in a Numerical Control (NC) program stored in the memory 106. Examples of operations directed by the controller 104 include, but are not limited to, controlling the magnetic field strength of the magnetic field 117 generated by the induction welding coil 116, controlling the amount of electrical current applied to the induction welding coil 116, controlling the rate of movement of the induction welding coil 116 relative to the components 118 and 120, feedback processes (e.g., temperature sensor feedback, the process flow 500 shown in FIG. 5, etc.), controlling a sampling rate of one or more of the EMF sensors 122 described below, and/or the like. One example of an implementation of the controller 104 is the computing device 1000 shown in FIG. 10. The induction welding coil 116 can be any type of coil operable to generate magnetic flux.

The induction welding coil 116 generates the magnetic field 117 at one side of the components 118 and 120 in response to applied current. The intensity of the magnetic field 117 that is generated by the induction welding coil 116 is based on the amount of current applied. Thus, the induction welding coil 116 is controllably adjusted in order to generate magnetic fields 117 of desired strength.

In operation, the magnetic fields 117 generated by the induction welding coil 116 causes the components 118 and 120 being welded to reach a transition temperature (e.g., a glass transition temperature, etc.). For example, at the transition temperature, the component 118 and 120 meld or weld together at the weld interface 108 into an integral mass that cools into a single, integral structure at the weld interface 108. The components 118 and 120 can include laminate, thermoplastic (e.g., polyetheretherketone (PEEK), polyetherketoneketone (PEKK), etc.), composite (e.g., a composite material that includes a matrix of thermoplastic reinforced by fibers, etc.), and/or any other material suitable for induction welding. The weld interface 108 extends a length along the components 118 and 120. One example of the length of the weld interface 108 is illustrated in FIG. 4A as weld interface 408. The length of the weld interface 108 may be referred to herein as a "weld path".

The induction welding system 100 includes one or more EMF sensors 122 that measures voltage indicative of magnetic field strength. Each EMF sensor 122 is configured to measure a field intensity of the magnetic field 117 generated by the induction welding coil 116 at the location of the EMF sensor 122 along the length of the weld interface 108. As will be described below, each EMF sensor 122 monitors (e.g., measures, etc.) a response of the material of the components 118 and 120 at the location of the EMF sensor 122 along the length of the weld interface 108 to electrical current swept through the induction welding coil 116. Each EMF sensor 122 includes any type of EMF sensor configured to measure magnetic field strength and/or intensity. Examples of the EMF sensor 122 include, but are not limited to, EMF sensors having a calibrated loop (not shown) that includes at least two hundred loops, EMF sensors designed for operation to acquire measurements at a sampling rate between one and five Megahertz, and/or the like. The induction welding system 100 may include any number of EMF sensors 122 overall, EMF sensor(s) 122 at any number of different locations along the length of the weld interface 108, and any number of EMF sensors 122 at each location along the length of the weld interface 108. As will be described below, various implementations of the present disclosure include one or more EMF sensors 122 located at an initial position (i.e., a starting position, weld length=0, etc.; e.g., the start zone 410 shown in FIG. 4A, etc.) of the induction welding coil 116 along the length of the weld interface 108. Moreover, and for example, some implementations of the induction welding system 100 include one or more EMF sensors 122 configured to measure the field intensity of the magnetic field 117 at various other locations along the length of the weld interface 108 (e.g., the EMF sensors 122b, 122c, and 122d located within a steady zone 446 of the length of a weld interface 408 shown in FIG. 4A; one or more EMF sensors 122, not shown, located within a stop zone 412 of the weld interface 408; etc.).

In some implementations, the induction welding system 100 includes one or more temperature sensors 124 that are each configured to measure temperature at the location of the temperature sensor 124. For example, during a welding operation, temperature sensors 124 may be used at various locations along the length of the weld interface 108 to measure the welding temperature at which the components 118 and 120 are being welded together. Each temperature sensor 124 includes any type of sensor configured to measure temperature, such as, but not limited to, thermocouples, infrared (IR) sensors, and/or the like. The induction welding system 100 may include any number of temperature sensors 124 overall, temperature sensor(s) 124 at any number of different locations along the length of the weld interface 108, and any number of temperature sensors 124 at each location along the length of the weld interface 108. For example, as shown in FIG. 4A, in some implementations the induction welding system 100 includes one or more temperature sensors 124a configured to measure the temperature within a start zone 410 of the length of a weld interface 408, one or more temperature sensors 124b, 124c, 124d, and 124e configured to measure the temperature at respective locations within the steady zone 446 of the length of the weld interface 408, and one or more temperature sensors 124f configured to measure the temperature within the stop zone 412 of the weld interface 408.

In some implementations, the induction welding system 100 includes one or more rate sensors 123 that are each configured to measure the rate (e.g., speed, etc.) of movement of the induction welding coil 116 relative to the components 118 and 120, for example as the induction welding coil 116 moves along the length of the weld interface 108. Each rate sensor 123 includes any type of sensor configured to measure the rate of movement of the induction welding coil 116 relative to the components 118 and 120. The induction welding system 100 may include any number of rate sensors 123. In some implementations, the induction welding system 110 includes one or more current sensors 125 that are each configured to measure the electrical current into the controller 104. Each current sensor 125 includes any type of sensor configured to measure the amount of electrical current into the controller 104. The induction welding system 100 may include any number of current sensors 125.

Figure 2:
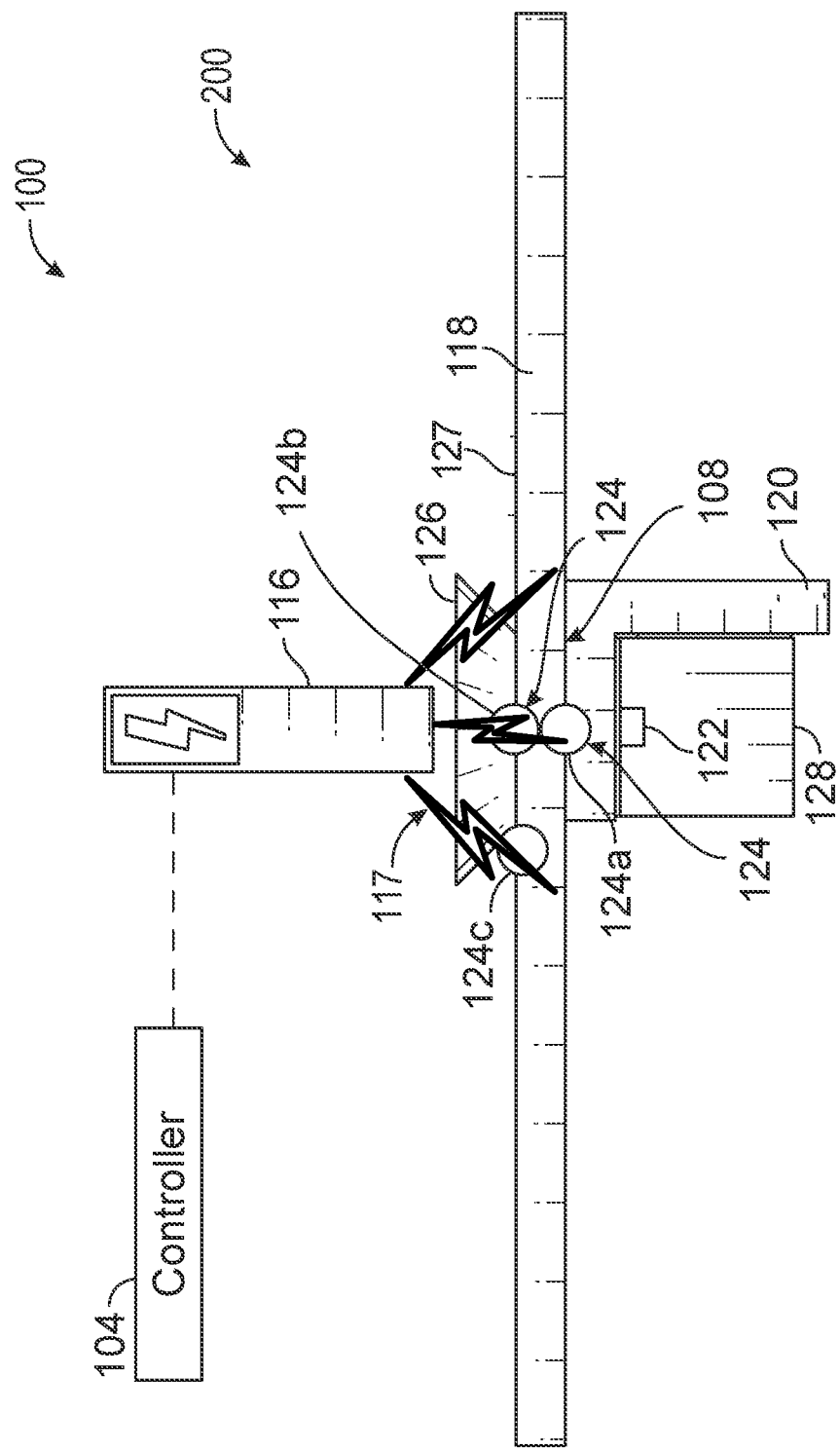
FIG. 2 illustrates an induction welding configuration of the induction welding system shown in FIG. 1, in accordance with an implementation.

FIG. 2 illustrates an induction welding configuration 200 of the induction welding system 100 according to an implementation of the present disclosure. The example of the configuration 200 is for illustration only. Other implementations of the induction welding system 100 can be used without departing from the scope of the present disclosure. That is, the present disclosure contemplates induction welding configurations having different shapes, sizes, configurations, arrangements, functionality, and/or the like.

The configuration 200 of the induction welding system 100 includes the induction welding coil 116, a heatsink 126, a mandrel 128, and the components 118 and 120. In operation, the induction welding coil 116 is placed on or adjacent the heatsink 126 to perform induction welding. That is, the heatsink 126 is placed between the induction welding coil 116 and the assembly of the components 118 and 120. The heatsink 126 absorbs and disperses heat from the surface (e.g., the surface 127, etc.) of the component 118 as the components 118 and 120 are induction welded. In other words, the components 118 and 120 are heated by the induction welding coil 116 during the induction welding operation with heat on the surface 127 of the component 118 being drawn off by the heatsink 126. This ensures that heat generated within the components 118 and 120 at the weld interface 108 does not cause the surface 127 to exceed the transition temperature (which may result in undesired structural changes to one or both of the components 118 and 120 being induction welded). In the example of FIG. 2, the components 118 and 120 are heated at the weld interface 108 from a single side thereof as shown in FIG. 2. In other words, the induction welding coil 116 is used on only one side of the assembly of the components 118 and 120. In other implementations, an induction welding coil 116 is used on two opposite sides of the assembly of the components 118 and 120.

Figure 3:
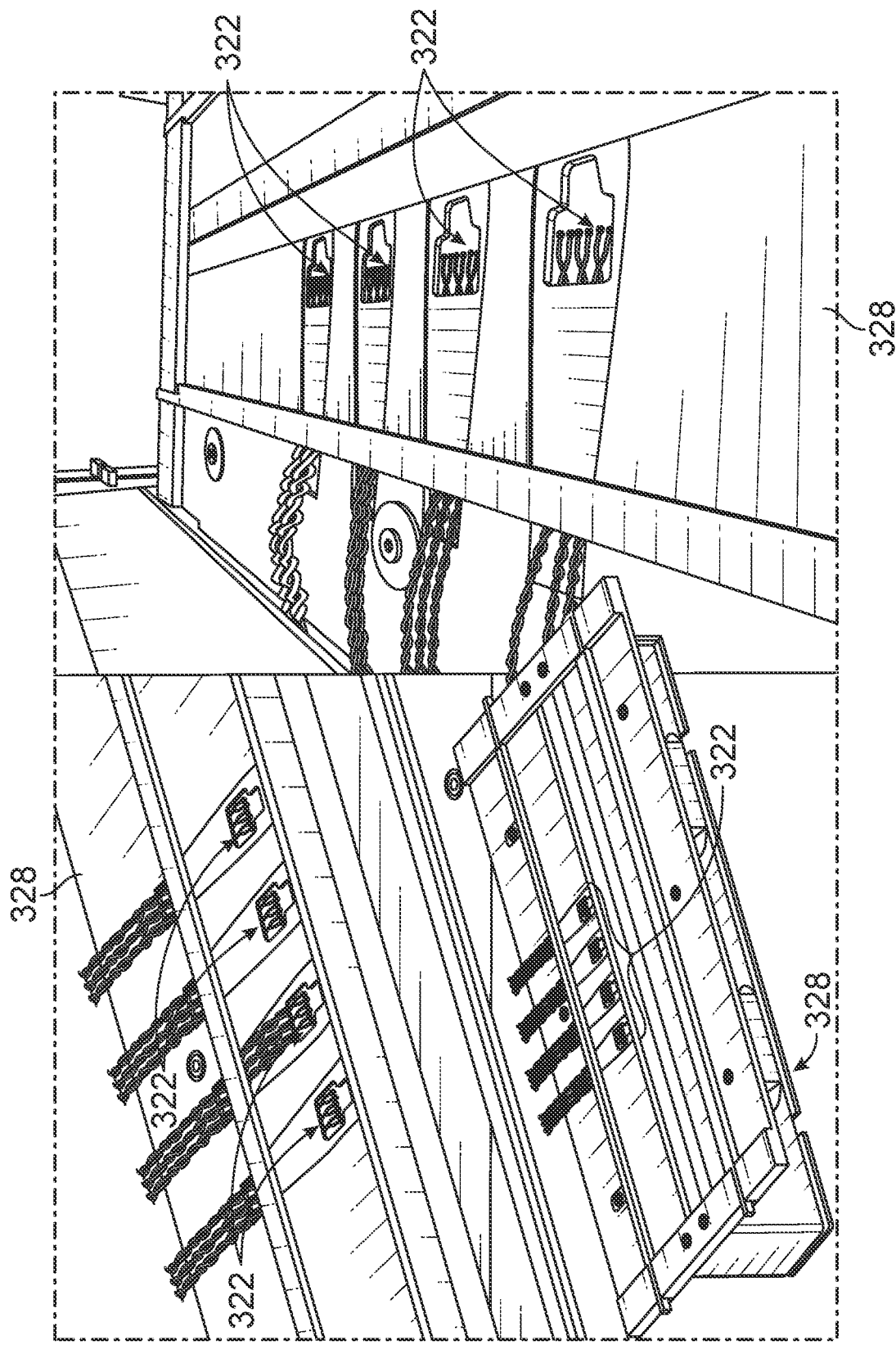
FIG. 3 illustrates a plurality of EMF sensors embedded within a mandrel that may be used with the induction welding system shown in FIG. 1.

Each EMF sensor 122 may be located at any location within the system 100 that enables the EMF sensor 122 to measure magnetic field strength and/or intensity at any location along the length of the weld interface 108. For example, in the implementation of FIG. 2, one or more EMF sensors 122 is embedded within the mandrel 128 at one or more locations along the length of the weld interface 108. FIG. 3 illustrates one example of a plurality of EMF sensors 322 embedded within a mandrel 328 that may be used with the induction welding system 100. In addition or alternatively to being embedded within the mandrel 128, in some implementations one or more EMF sensors 122 is embedded within the heatsink 126 (e.g., at the location of the temperature sensor 124b described below, etc.) at one or more locations along the length of the weld interface 108. Other examples include one or more EMF sensors 122 positioned on a surface 130 of the component 118 (e.g., at the location of the temperature sensor 124c described below, etc.) at one or more locations along the length of the weld interface 108, one or more EMF sensors 122 positioned within the weld interface 108 between the components 118 and 120 (e.g., at the location of the temperature sensor 124a described below, etc.) at one or more locations along the length of the weld interface 108, etc. Other locations of EMF sensors 122 are contemplated as being within the scope of the present disclosure. In some implementations, one or more of the EMF sensors 122 is elongate (i.e., longitudinally shaped), with the length of the EMF sensor 122 running parallel to the length of the weld interface 108 such that the EMF sensor 122 is configured to measure magnetic field strength at a plurality of locations along the length of the weld interface 108. In some implementations, one or more of the EMF sensors 122 is a spot sensor configured to measure magnetic field strength at one location along the length of the weld interface 108, for example the spot sensor arrangement shown in FIG. 3 wherein the EMF sensors 322 are spaced apart from each other along the length of the mandrel 328.

Each temperature sensor 124 may be located at any location within the system 100 that enables the temperature sensor 124 to measure temperature at any location along the length of the weld interface 108. For example, the system 100 may include one or more temperature sensors 124 embedded within the mandrel 128 and/or one or more temperature sensors 124 embedded within the heatsink 126. In the implementation of FIG. 2, the system 100 includes one or more temperature sensors 124a positioned within the weld interface 108 between the components 118 and 120 at one or more locations along the length of the weld interface 108, one or more temperature sensors 124b embedded within the heatsink 126 at one or more locations along the length of the weld interface 108, and one or more temperature sensors 124c positioned on a surface 130 of the component 118 at one or more locations along the length of the weld interface 108. Other locations of temperature sensors 124 are contemplated as being within the scope of the present disclosure.

Figure 4:
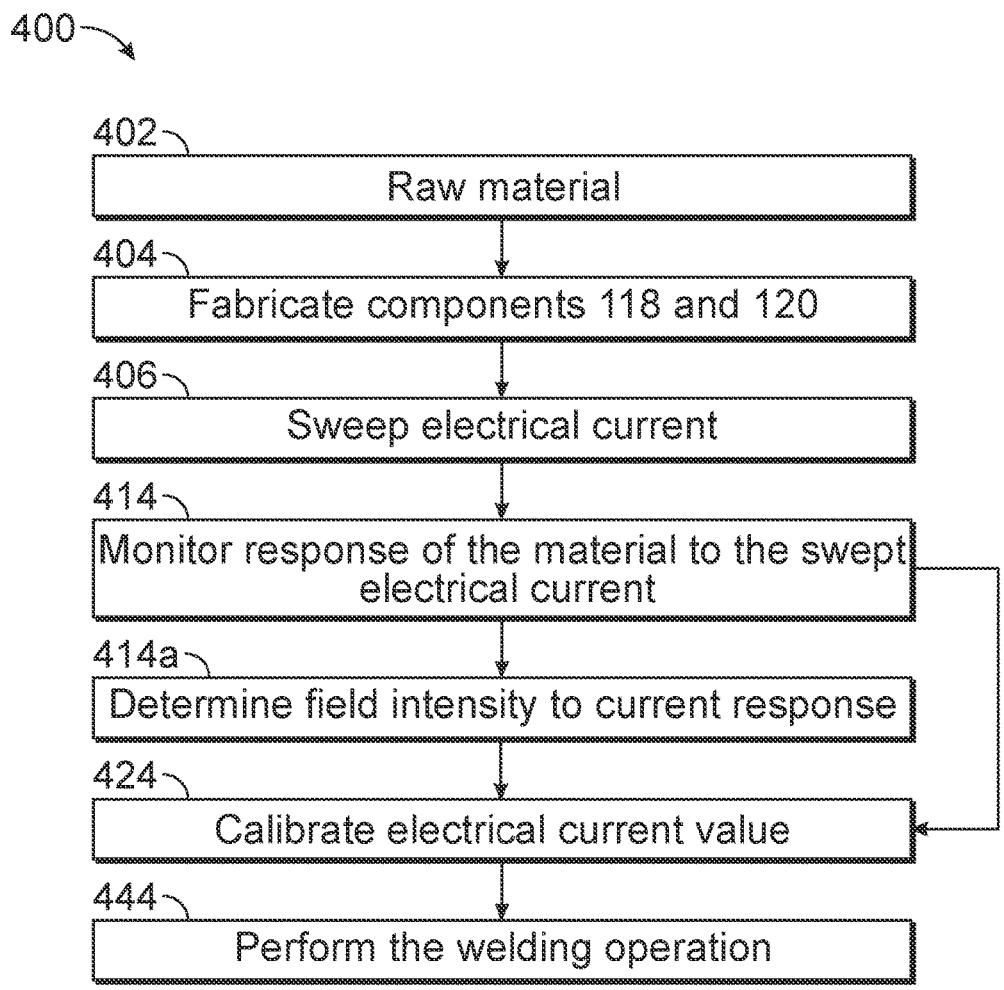
FIG. 4 is a block diagram of an induction welding operation process flow, in accordance with an implementation.
Figure 4A:
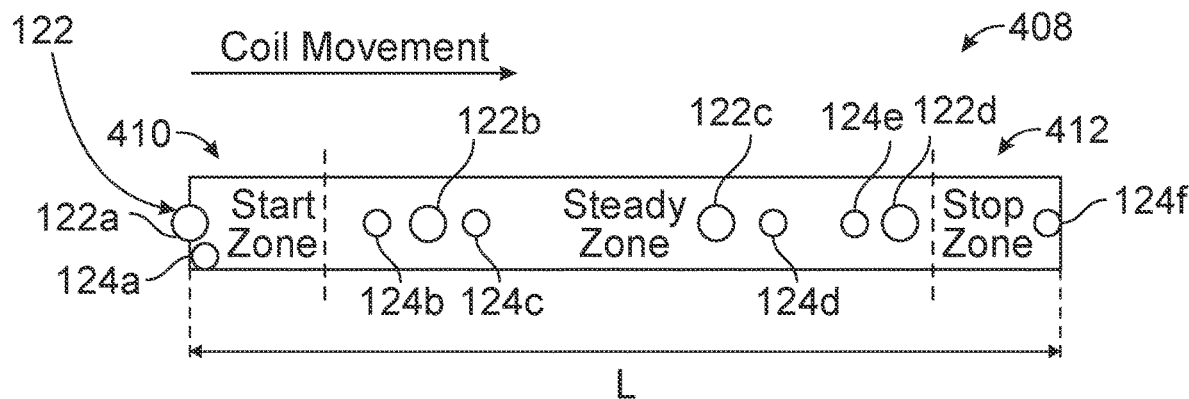
FIG. 4A illustrates one example of a weld interface, in accordance with an implementation.

FIG. 4 is a block diagram of an induction welding operation process flow 400 in accordance with an implementation of the present disclosure. The induction welding operation process flow 400 can be implemented by any induction welding system, such as, but not limited to, the induction welding system 100 illustrated in FIG. 1, and/or the like. The induction welding operation process flow 400 may be performed manually by a human operator, semi-autonomously using both a computing device and a human operator, or fully autonomously using a computing device. For example, in some implementations the operations illustrated in FIG. 4 are performed, at least in part, by a computing device such as, but not limited to, the controller 104 shown in FIG. 1, the computing device 1000 shown in FIG. 10, and/or the like. Various implementations of the induction welding operation process flow 400 can be performed without departing from the scope of the present disclosure.

The process flow 400 includes fabricating 404 the components 118 and 120 using raw material 402. The fabricated components 118 and 120 are assembled within the induction welding system 100 such that an induction welding operation can be performed on components 118 and 120 to induction weld the components 118 and 120 together along the weld interface 108. The components 118 and 120 and the assembly thereof represent at least a portion of one batch of a given component configuration. As used herein, a "component configuration" is the configuration of the materials, layup, manufacturing history, geometry, overlap region, tooling, and/or the like of a component assembly within the induction welding system 100. It has been shown that the variances (e.g., material variances, fabrication process variances, etc.) between different batches of the same component configuration may significantly affect the current-temperature relationship and thereby the electrical current value required to achieve a predetermined welding temperature.

To account for batch variability in the temperature to current calibration, the induction welding operation process flow 400 includes sweeping 406 electrical current through the induction welding coil 116 at an initial position of the induction welding coil 116 along the length of the weld interface 108 of the components 118 and 120. As used herein, "sweeping" electrical current (and electrical current that is "swept") through the induction welding coil 116 means an increasing value of electrical current is applied to the induction welding coil 116. The electrical current is swept through the induction welding coil 116 from zero to a value that is less than a value of the electrical current that induces a calibration weld temperature. In other words, the electrical current is swept through the induction welding coil 116 from an electrical current value that induces room temperature to an electrical current value that induces a temperature below a calibration weld temperature. Accordingly, the electrical current is swept through the induction welding coil 116 to a value that is less than a value of the electrical current that induces a welding temperature (i.e., a temperature that causes the components 118 and 120 to weld together. As used herein, a "calibration weld temperature" is a temperature that is sufficiently high to be above the glass transition temperature of the components 118 and 120 at the weld interface 108 but is less than the predetermined welding temperature used to fuse the components 118 and 120 together. Calibration weld temperatures are used to make calibration or other test welds that are traditionally used to calibrate the electrical current value used for the induction welding operation.

As briefly described above, the electrical current sweep is performed with the induction welding coil 116 at an initial position (i.e., a starting position, weld length=0, etc.; e.g., the start zone 410 shown in FIG. 4A, etc.) along the length of the weld interface 108. FIG. 4A illustrates one example of a weld interface 408 that extends a length L from a start zone 410 to a stop zone 412. The start zone 410 defines the initial position of the induction welding coil 116 during the induction welding operation. The stop zone 412 defines the final position of the induction welding coil 116 during the induction welding operation. As shown in FIG. 4A, one or more EMF sensors 122 is positioned to monitor a response of the material of the components 118 and 120 to the swept electrical current, as will be described below.

In some implementations, the electrical current sweep 406 is a static sweep wherein the induction welding coil 116 remains stationary relative to the components 118 and 120 during the electrical current sweep. For example, for a static induction welding coil 116, the electrical current sweep 406 may include inputting an electrical current value of (x, x+10, +20, +30, +40, etc.) into the induction welding coil 116 at a single point along an overlap of the components 118 and 120 (e.g., a single point, such as the initial position, along the length of the weld interface 108; a single point along a width of the weld interface 108; etc.). In some other implementations, the electrical current sweep 406 is a dynamic sweep wherein the induction welding coil 116 is moved relative to the components 118 and 120 during the electrical current sweep (i.e., the induction welding coil 116 is fed past the components 118 and 120, or vice versa). For example, for a dynamic induction welding coil 116, the electrical current sweep 406 may include using a value of (x) current on the induction welding coil 116, doing a pass over the components 118 and 120, and then repeating at a value of (x+20, 30, 40, etc.) to understand the temperature-current relationship for the material at different points along an overlap of the components 118 and 120 (e.g., different points along the length of the weld interface 108, different points along the width of the weld interface, etc.).

Figure 4B:
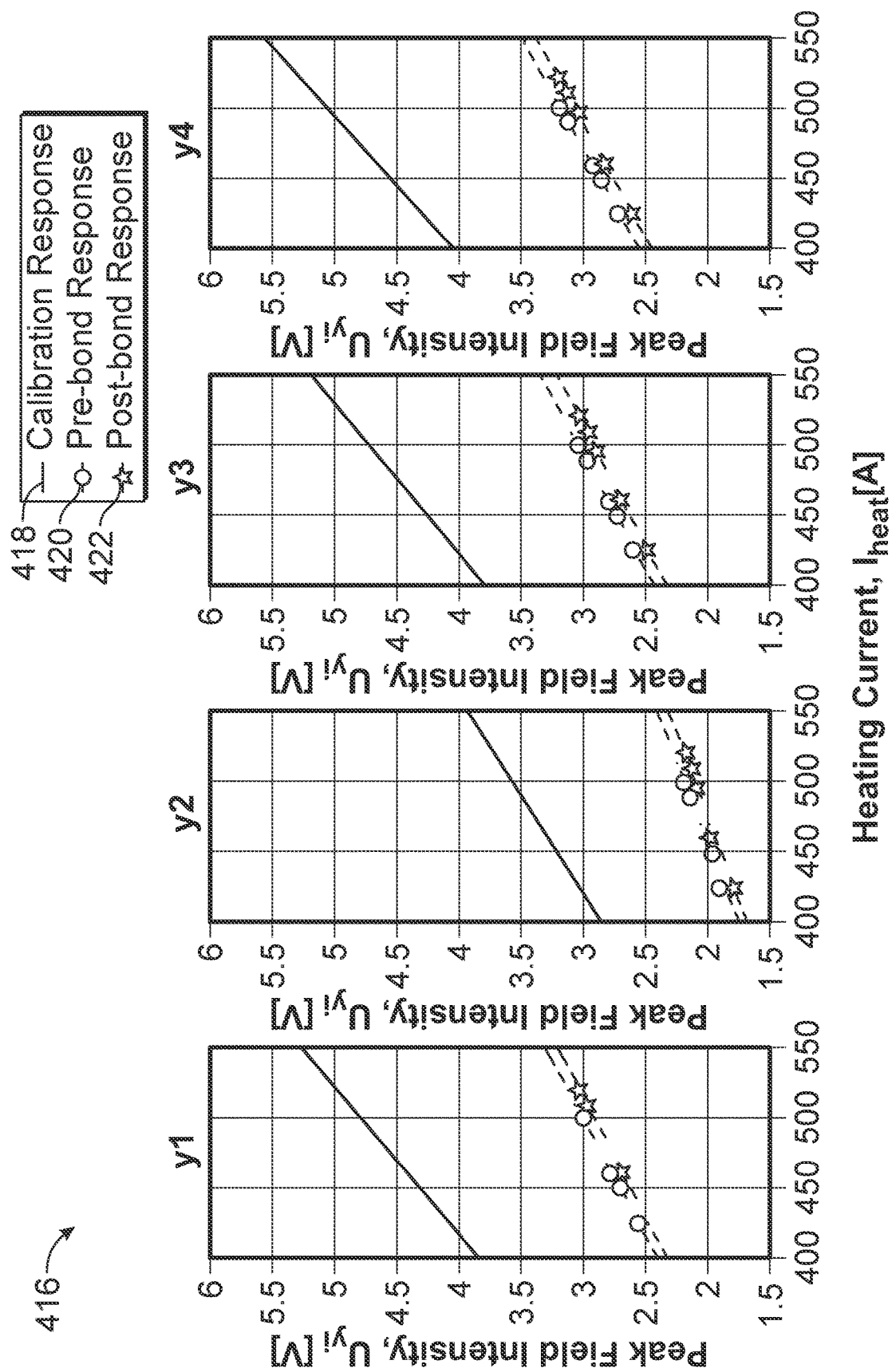
FIG. 4B illustrates one example of a field intensity to current response, in accordance with an implementation.

The induction welding operation process flow 400 includes monitoring 414 a response of the material of the components 118 and 120 to the swept electrical current using the EMF sensor 122a. For example, the EMF sensor 122a measures a magnetic field intensity of the swept electrical current at the initial position of the induction welding coil 116 (e.g., at the start zone 410) along the length of the weld interface 408. In some implementations, the measured field intensity of the swept electrical current at the initial position of the induction welding coil 116 along the length of the weld interface 408 is used to determine 414a the field intensity to current response of the material of the components 118 and 120 to the swept electrical current at the initial position of the induction welding coil 116. For example, FIG. 4B illustrates one example of a field intensity to current response 416. In FIG. 4B, a calibration response line 418 represents a baseline response at the initial position of the induction welding coil 116 with no components assembled within the induction welding system 100, a pre-bond response line 420 represents a response of the material of the components 118 and 120 at the initial position of the induction welding coil 116 before the components 118 and 120 have been welded together along the weld interface 408, and a post-bond response line 422 represents a response of the material of the components 118 and 120 at the initial position of the induction welding coil 116 after the components 118 and 120 have been welded together along the weld interface 408.

The induction welding operation process flow 400 includes calibrating 424 an electrical current value for the induction welding operation using the monitored response of the material of the components 118 and 120 to the swept electrical current. Calibrating the electrical current value using the monitored response may include selecting a value that is expected to induce a predetermined (i.e., target) welding temperature, for example when an electrical current value for the configuration and/or batch of the components 118 and 120 is not available or has not been established. In addition or alternatively, calibrating the electrical current value using the monitored response may include adjusting an established value for the configuration and/or batch of the components 118 and 120 such that the adjusted value is expected to induce the predetermined (i.e., target) welding temperature.

In some implementations, calibrating the electrical current value using the monitored response of the material of the components 118 and 120 to the swept electrical current includes extrapolating a trend line of the monitored response of the material. For example, the field intensity to current response determined from the EMF sensor 122a can be combined with a temperature to current response of the induction welding system 100 (e.g., of the heatsink 126, within the weld interface 408, of the material of the components 118 and 120, etc.) to generate a field intensity loss chart (e.g., the field intensity loss chart 426 shown in FIG. 4C, etc.) that plots filed intensity loss against electrical current and welding temperature. The temperature to current response of the induction welding system 100 may be obtained, for example, using the temperature sensors 124 (e.g., at any position(s) of the induction welding coil 116 along the length of the weld interface 408, etc.), from one or more established temperature to current responses of the configuration and/or batch of the components 118 and 120, etc. A trend line of electrical current verses field intensity loss can be extrapolated to predict (and thereby calibrate) the electrical current value that is expected to induce the predetermined welding temperature.

Figure 4C:
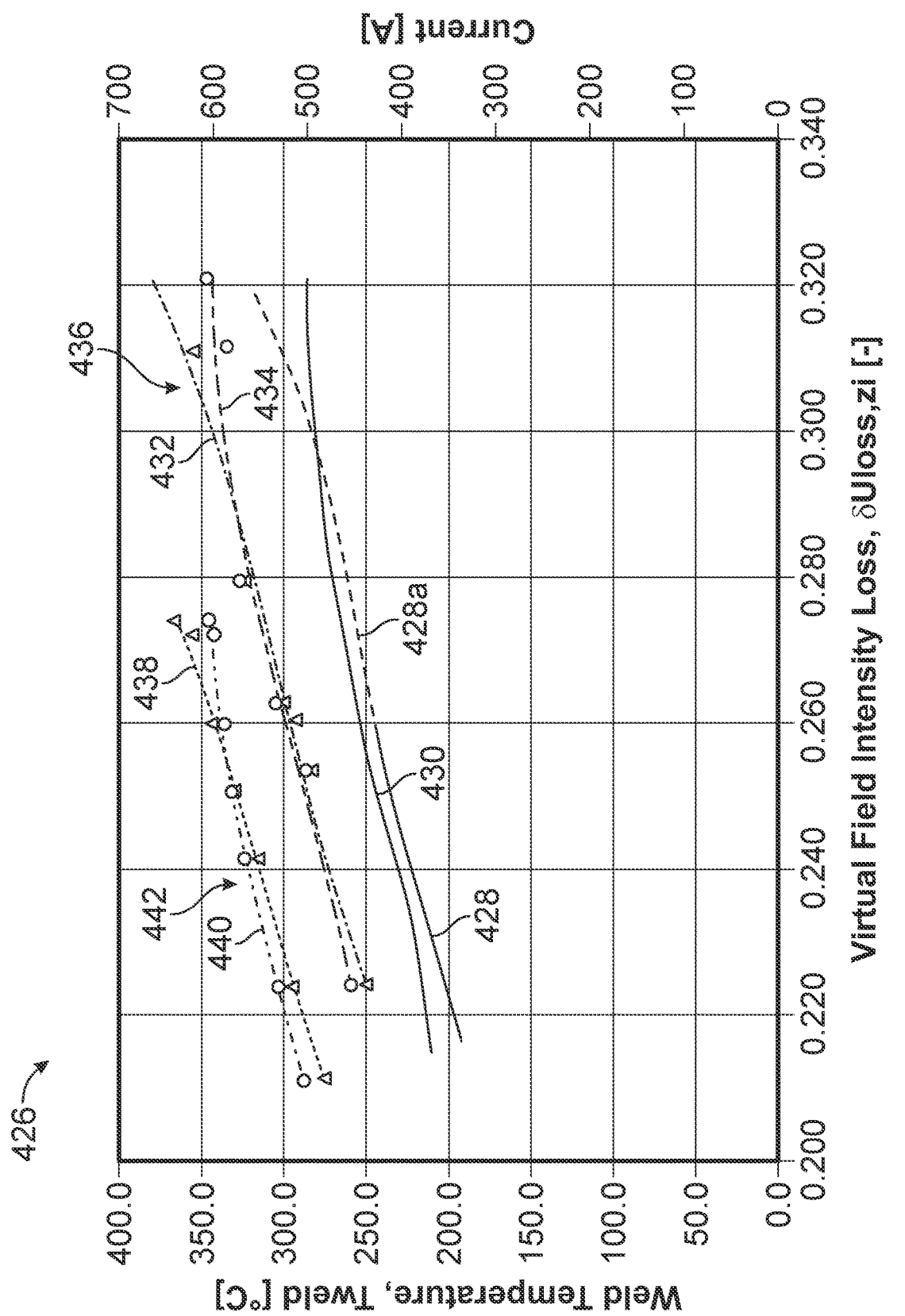
FIG. 4C illustrates one example of a field intensity loss chart, in accordance with an implementation.

For example, FIG. 4C illustrates one example of a field intensity loss chart 426. In FIG. 4C, a current verses field intensity loss response of the material of the components 118 and 120 at the initial position of the induction welding coil 116 is represented by a solid trend line 428. As shown with the dashed line 428a, the trend line 428 can be extrapolated to predict (and thereby calibrate) the electrical current value that is expected to induce the predetermined welding temperature. In some implementations, the trend line 428 is extrapolated along the dashed line 428a using the slope of the trend line 428 (i.e., the slope of the solid line 428). In addition or alternatively, the trend line 428 is extrapolated along the dashed line 428a using (e.g., a slope of, etc.) a trend line 430 of temperature verses field intensity loss response of the components 118 and 120.

In some implementations, calibrating the electrical current value using the monitored response of the material of the components 118 and 120 to the swept electrical current includes comparing the monitored response of the material to at least one established response of the same configuration but a different batch of the material of the components 118 and 120. Established responses of different batches of the material of the components 118 and 120 may include the material response of previous welding operations performed on other batches of the same configuration of the components 118 and 120 (e.g., at various locations along the length of the weld interface 408 such that the established responses define trend lines that represent current and/or temperature verses field intensity loss response as the induction welding coil 116 moves along the length of the weld interface 408 during a welding operation, etc.). In some implementations, and for example, the monitored response of the material of the components 118 and 120 is compared to a database that includes a plurality of established responses of different batches of the of the same configuration of the components 118 and 120. An example of such a database is described below with respect to the database building process flow 600 shown in FIG. 6. It should be understood that increasing the number of established responses within the database will increase the accuracy of the calibration of the electrical current value performed by the induction welding operation process flow 400 (e.g., a feedback control system may increase the number of established response and/or accuracy of the calibration, etc.). Accordingly, welding operations performed on different batches of the same configuration of the components 118 and 120 can be added to the database such that the accuracy of calibration of the electrical current value further improves as each newly performed welding operation is added to the database.

In one example of comparing the monitored response of the material of the components 118 and 120 to an established response, the monitored response of the material is compared to at least one trend line that represents an established current and/or temperature verses field intensity loss response, and an offset of the monitored response of the material from trend line(s) is determined. The determined offset can then be used to calibrate the electrical current value that is expected to induce the predetermined welding temperature. For example, and referring again to FIG. 4C, the field intensity loss chart 426 includes an established current verses field intensity loss response trend line 432 and an established temperature verses field intensity loss response trend line 434 of a batch 436 of the material of the components 118 and 120. The field intensity loss chart 426 further includes an established current verses field intensity loss response trend line 438 and an established temperature verses field intensity loss response trend line 440 of a different batch 442 of the material. By comparing the shape (e.g., slope, curve, etc.) of the trend lines 428 and 430 to the shape of the respective trend lines 432 and 434 and/or the respective trend lines 438 and 440, the trend line 428 can be extrapolated as shown with the dashed line 428a. The difference between the dashed line 428a and the trend line 432 and/or 438 may be used to determine an offset used to calibrate the electrical current value that targets the predetermined welding temperature.

By sweeping the electrical current through the induction welding coil 116 at the initial position of the induction welding coil 116 along the weld interface 408, implementations disclosed herein use the material response thereto to calibrate the electrical current required to reach the predetermined welding temperature. Accordingly, implementations disclosed use the components 118 and 120 and the EMF sensor(s) 122 to enable calibration (e.g. prediction, etc.) of the electrical current value that induces the predetermined welding temperature before the induction welding coil moves over the desired position of the weld. Implementations disclosed herein thus obtain the current-temperature response of the material more quickly, without creating a weld, prior to creating a weld, without undesirably altering the objects to be welded, and/or without damaging the objects to be welded. In some implementations, the electrical current value is calibrated before a weld is generated on any material of the batch of the components 118 and 120.

The induction welding operation process flow 400 includes performing 444 the induction welding operation along the length of the weld interface 408 of the components 118 and 120 using the calibrated electrical current value.

In some implementations, performing the induction welding operation along the length of the weld interface 408 using the calibrated electrical current value includes adjusting the electrical current value for the induction welding operation in real time as the induction welding coil 116 moves along the length of the weld interface 408, for example to account for variations (e.g., in thickness, geometry, welding speed, etc.) of the material along the length of the weld interface 408. For example, performing the induction welding operation along the length of the weld interface 408 using the calibrated electrical current value may include measuring a temperature of the material of the components 118 and 120 at different locations along the length of the weld interface 408 during the induction welding operation (e.g., using one or more of the temperature sensors 124, etc.), and adjusting the electrical current value for the induction welding operation based on the measured temperatures. In other words, some implementations of the present disclosure measure the welding temperature as the weld progresses and adjust the electrical current value during the induction welding operation based on the feedback of the measured welding temperatures. In this manner, the welding temperature can be verified as the induction welding coil 116 moves along the length of the welding interface. Accordingly, if the measured welding temperature deviates from the predetermined welding temperature the electrical current value can be adjusted to bring the actual welding temperature back in line with the predetermined welding temperature.

Moreover, and for example, performing the induction welding operation along the length of the weld interface 408 using the calibrated electrical current value may include measuring the material response of the components 118 and 120 at different locations along the length of the weld interface 408 during the induction welding operation (e.g., using one or more of the EMF sensors 122, etc.), and adjusting the electrical current value for the induction welding operation based on the measured temperatures. In other words, some implementations of the present disclosure measure the material response as the weld progresses and adjust the electrical current value in real time during the induction welding operation based on the feedback of the measured material response. For example, as described above and shown in FIG. 4A, in some implementations the induction welding system 100 includes the EMF sensors 122b, 122c, and 122d located within the steady zone 446 of the length of the weld interface 408 to enable real-time adjustment of the electrical current value of the induction welding coil 116 during a welding operation.

In some implementations, the induction welding system 100 includes temperature sensors 124 configured to measure the temperature at various locations along the length of the weld interface 408 to enable real-time adjustment of the electrical current value of the induction welding coil 116 during a welding operation. For example, in the example shown in FIG. 4A, the induction welding system 100 includes one or more temperature sensors 124a configured to measure the temperature within the start zone 410 of the length of the weld interface 408, one or more temperature sensors 124b, 124c, 124d, and 124e configured to measure the temperature at respective locations within a steady zone 446 of the length of the weld interface 408, and one or more temperature sensors 124f configured to measure the temperature within the stop zone 412 of the weld interface 408. Although six locations are shown in FIG. 4A, the induction welding system 100 may include one or more temperature sensors 124 configured to measure the temperature at any number of different locations along the length of the weld interface 408. In some implementations, the induction welding system 100 includes one or more EMF sensors 122 configured to measure magnetic field strength and/or intensity at various locations along the length of the weld interface 408 during a welding operation, for example for obtaining field intensity to current responses during welding operations for storing in the database.

Figure 5:
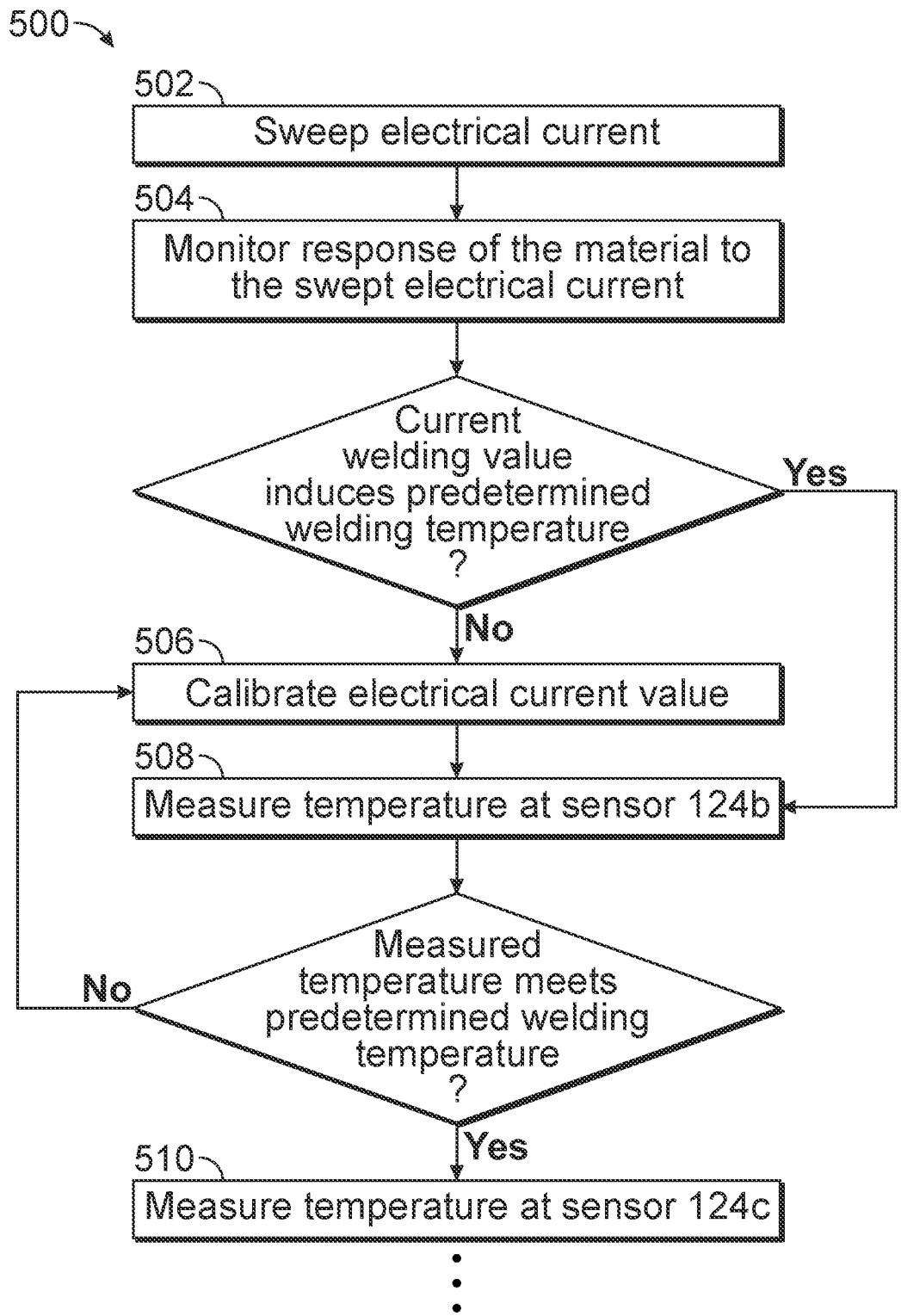
FIG. 5 is a block diagram of an induction welding operation process flow, in accordance with an implementation.

FIG. 5 is a block diagram of an induction welding operation process flow 500 that illustrates one example of a feedback loop for real-time adjustment of the electrical current value of the induction welding coil 116 during a welding operation. The induction welding operation process flow 500 includes sweeping 502 electrical current through the induction welding coil 116 at an initial position of the induction welding coil 116 along the length of the weld interface 408. The response of the material of the components 118 and 120 to the swept electrical current is monitored 504 using the EMF sensor 122a. If the monitored response indicates that a current welding value of the electrical current of the induction welding coil 116 will not induce the predetermined welding temperature, or a current value has not been selected, the process flow 500 includes calibrating 506 an electrical current value for the induction welding operation using the monitored response of the material of the components 118 and 120 to the swept electrical current.

After calibration, or if the monitored response indicates that a current welding value of the electrical current of the induction welding coil 116 will induce the predetermined welding temperature, the process flow 500 includes measuring 508 the temperature as the induction welding coil 116 passes over the measurement location of the temperature sensor 124b. If the measured temperature does not meet (or is not within a range of) the predetermined welding temperature, the process flow 500 returns to the calibration step 506. After calibration, or if the measured temperature at the location of the temperature sensor 124b meets (or is within a range of) the predetermined welding temperature, the process flow 500 includes measuring 510 the temperature as the induction welding coil 116 passes over the measurement location of the temperature sensor 124c and returning to the calibration step 506 if the measured temperature does not meet (or is not within a range of) the predetermined welding temperature. As the induction welding operation progresses, the process flow 500 repeats the temperature measurement and any necessary calibration as the induction welding coil 116 passes over the measurement locations of each of the temperature sensors 124d, 124e, and 124f until the induction welding operation is complete. In some implementations, in addition or alternatively to measured temperature, the process flow 500 includes using other sensor data (e.g., material response measured by the EMF sensors 122, welding speed as measured by the rate sensors 123, etc.) for feedback control during the induction welding operation. For example, as described above, during the induction welding operation the material response of the components 118 and 120 may be measured at different locations along the length of the weld interface 408 (e.g., using the EMF sensors 122b, 122c, and/or 122d; using one or more EMF sensors 122 located at other locations along the length of the weld interface 408; etc.) for obtaining feedback that enables real time calibration as the induction welding coil 116 moves along the length of the weld interface 408.

The induction welding operation process flow 500 may be performed manually by a human operator, semi-autonomously using both a computing device and a human operator, or fully autonomously using a computing device. For example, in some implementations the operations illustrated in FIG. 5 are performed, at least in part, by a computing device such as, but not limited to, the controller 104 shown in FIG. 1, the computing device 1000 shown in FIG. 10, and/or the like. Various implementations of the induction welding operation process flow 500 can be performed without departing from the scope of the present disclosure.

Figure 6:
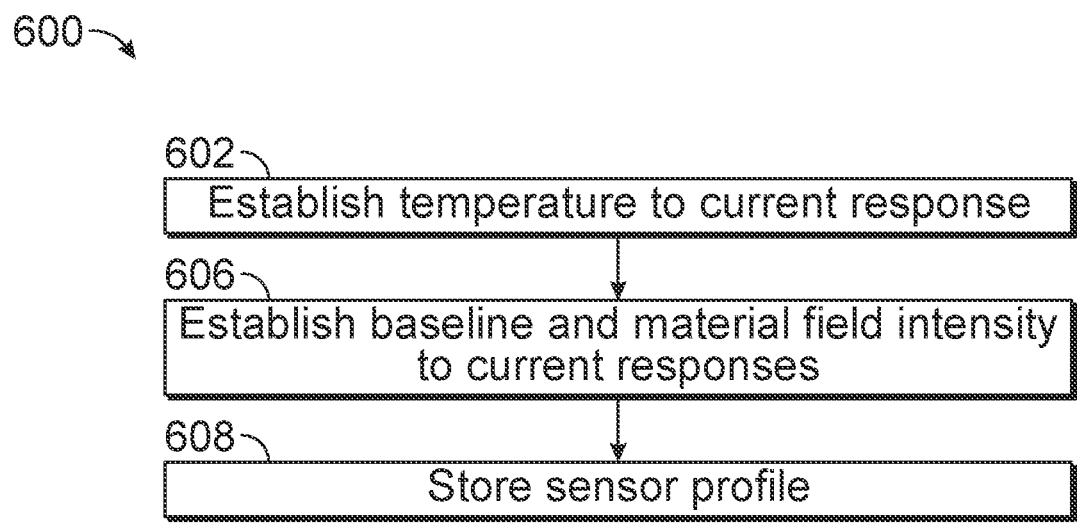
FIG. 6 is a block diagram of a database building process flow, in accordance with an implementation.
Figure 6A:
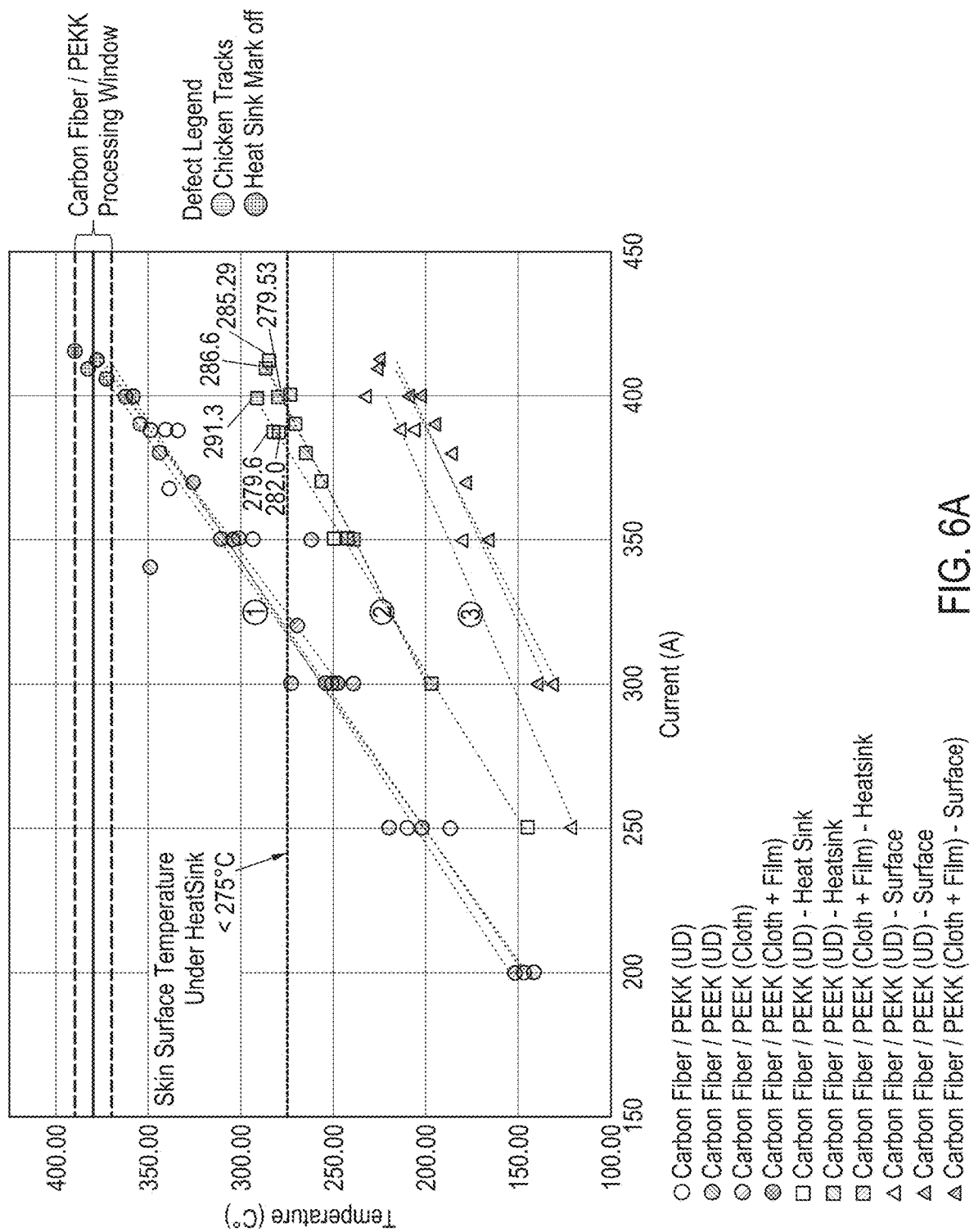
FIG. 6A illustrates one example of a chart of temperature to current responses at various locations within an induction welding system, in accordance with an implementation.

FIG. 6 is a block diagram of the database building process flow 600 in accordance with an implementation of the present disclosure. The database building process flow 600 includes establishing 602 a temperature to current response of the induction welding system 100 (e.g., of the heatsink 126, within the weld interface 108, of the material of the components 118 and 120, etc.). In some implementations, establishing the temperature to current response of the induction welding system 100 is repeated for multiple electrical currents until the predetermined welding temperature is reached. The temperature to current response of the induction welding system 100 may be obtained, for example, using the temperature sensors 124 (e.g., at any position(s) of the induction welding coil 116 along the length of the weld interface 108, etc.) during welding operations performed on components of the same configuration. FIG. 6A illustrates one example of a chart 604 of temperature to current responses at various locations within the induction welding system 100.

The database building process flow 600 includes establishing 606 baseline and material field intensity to current responses. The baseline and material field intensity to current responses may be obtained, for example, using the EMF sensors 122 (e.g., at any position(s) of the induction welding coil 116 along the length of the weld interface 108, etc.). FIG. 4B illustrates one example of baseline and material field intensity to current responses. For example, the calibration response line 418 of FIG. 4B represents a baseline response at the initial position of the induction welding coil 116 with no components assembled within the induction welding system 100, the pre-bond response line 420 represents a response of the material of the components 118 and 120 at the initial position of the induction welding coil 116 before the components 118 and 120 have been welded together along the weld interface 108, and the post-bond response line 422 represents a response of the material of the components 118 and 120 at the initial position of the induction welding coil 116 after the components 118 and 120 have been welded together along the weld interface 108. Establishing baselines for other sensed parameters (e.g., field strength and/or intensity, temperature, coil movement rate, etc.) for the database are also contemplated as being within the scope of the present disclosure.

In some implementations, the database building process flow 600 includes storing 608 a sensor profile of the EMF sensors 122 and/or the temperature sensors 124. For example, the location of the EMF sensors 122 and/or the temperature sensors 124 along the length of the weld interface 108 may be stored in the database.

The database building process flow 600 may be performed manually by a human operator, semi-autonomously using both a computing device and a human operator, or fully autonomously using a computing device. For example, in some implementations the operations illustrated in FIG. 6 are performed, at least in part, by a computing device such as, but not limited to, the controller 104 shown in FIG. 1, the computing device 1000 shown in FIG. 10, and/or the like. Various implementations of the database building process flow 600 can be performed without departing from the scope of the present disclosure.

Figure 7:
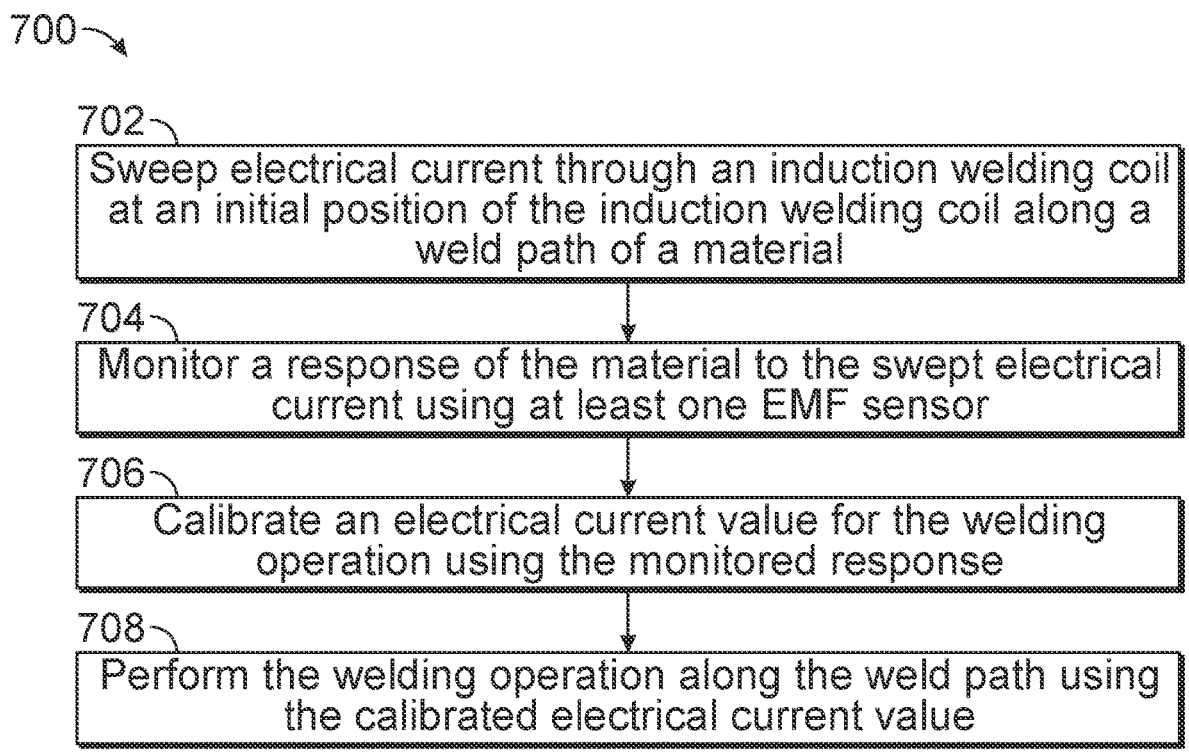
FIG. 7 is a flow chart illustrating a method for controlling an induction welding operation, in accordance with an implementation.

FIG. 7 is a flow chart illustrating a method 700 for controlling an induction welding operation according to an implementation. The method 700 can be implemented by any induction welding system, such as, but not limited to, the induction welding system 100 illustrated in FIG. 1, and/or the like. Although described herein as a series of steps, additional steps can be performed, steps can be removed, or steps can be performed in a different order without departing from the scope of the present disclosure. The method 700 may be performed manually by a human operator, semi-autonomously using both a computing device and a human operator, or fully autonomously using a computing device. For example, in some implementations the steps illustrated in FIG. 7 are performed, at least in part, by a computing device such as, but not limited to, the controller 104 shown in FIG. 1, the computing device 1000 shown in FIG. 10, and/or the like. Various implementations of the method 700 can be performed without departing from the scope of the present disclosure.

The method 700 includes sweeping, at 702, electrical current through an induction welding coil at an initial position of the induction welding coil along a weld path of a material. At 704, the method 700 includes monitoring a response of the material to the swept electrical current using at least one electromagnetic field (EMF) sensor. At 706, the method 700 includes calibrating an electrical current value for the induction welding operation using the monitored response. The method 700 includes performing, at 708, the induction welding operation along the weld path using the calibrated electrical current value.

Figure 8:
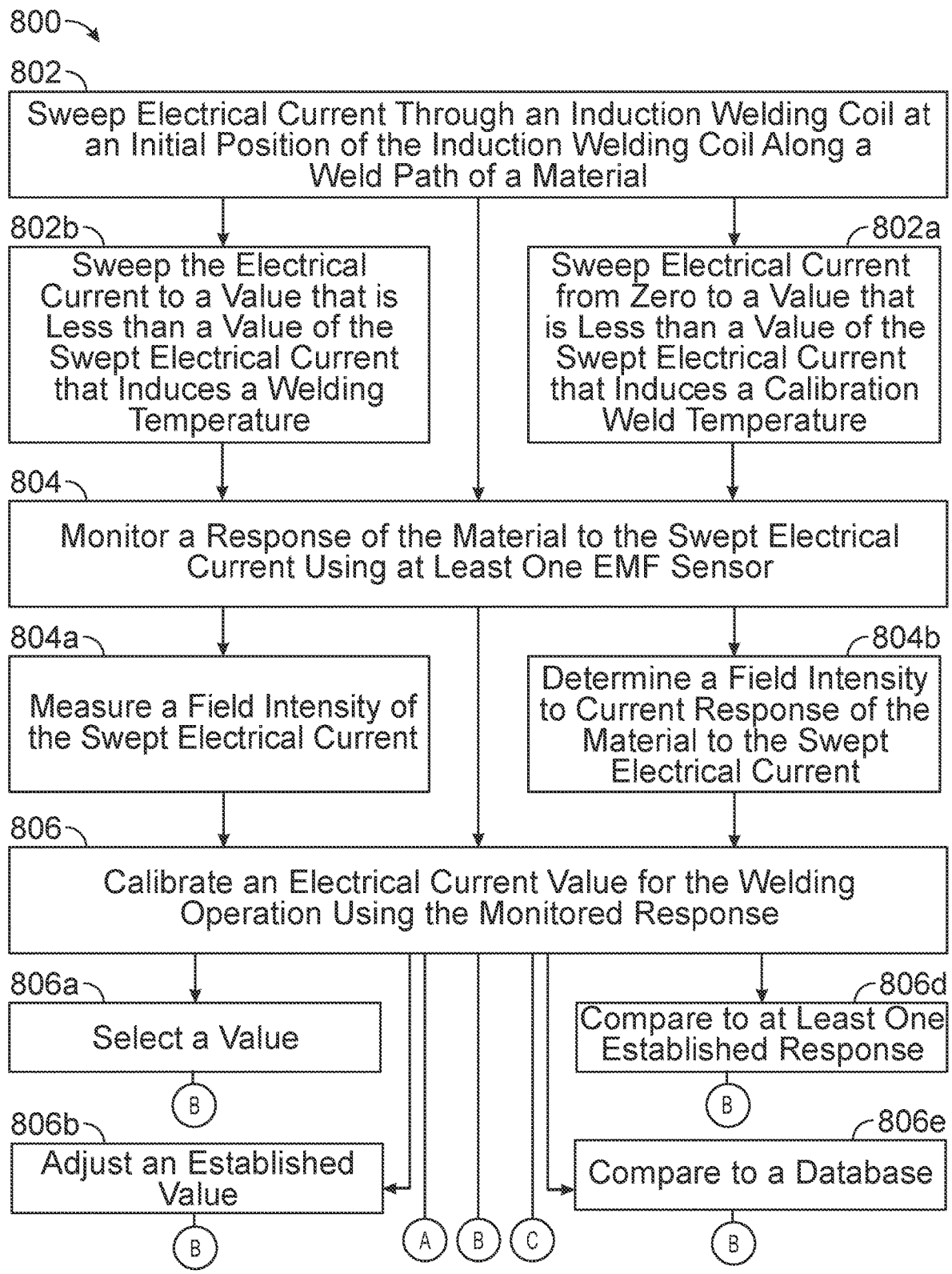
FIG. 8 is a flow chart illustrating a method for controlling an induction welding operation, in accordance with an implementation.
Figure 8:
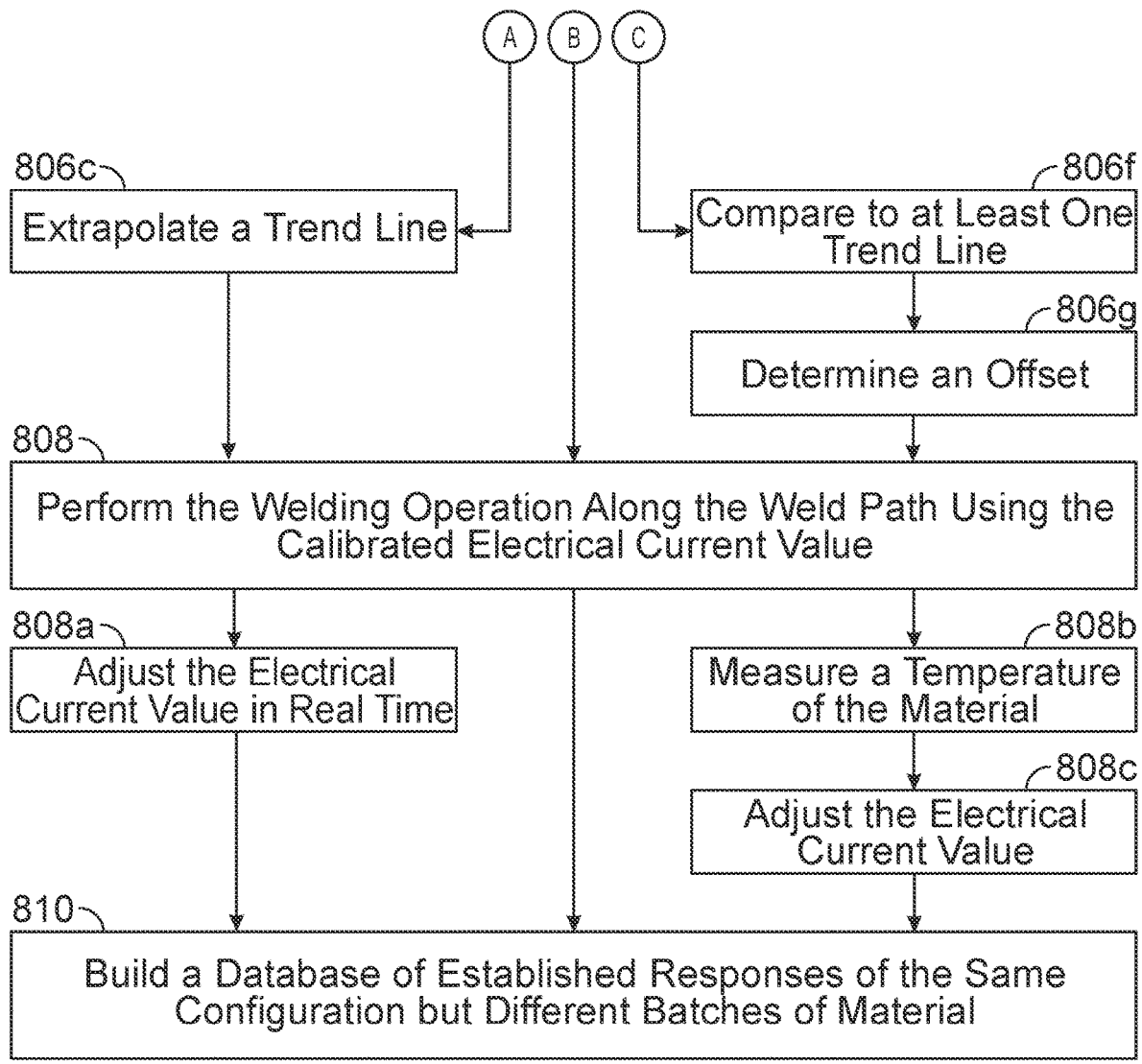

FIG. 8 is a flow chart illustrating a method 800 for controlling an induction welding operation according to an implementation. The method 800 can be implemented by any induction welding system, such as, but not limited to, the induction welding system 100 illustrated in FIG. 1, and/or the like. Although described herein as a series of steps, additional steps can be performed, steps can be removed, or steps can be performed in a different order without departing from the scope of the present disclosure. The method 800 may be performed manually by a human operator, semi-autonomously using both a computing device and a human operator, or fully autonomously using a computing device. For example, in some implementations the steps illustrated in FIG. 8 are performed, at least in part, by a computing device such as, but not limited to, the controller 104 shown in FIG. 1, the computing device 1000 shown in FIG. 10, and/or the like. Various implementations of the method 800 can be performed without departing from the scope of the present disclosure.

The method 800 includes sweeping, at 802, electrical current through an induction welding coil at an initial position of the induction welding coil along a weld path of a material. In some implementations, sweeping at 802 electrical current through the induction welding coil includes sweeping, at 802*a*, electrical current from zero to a value that is less than a value of the swept electrical current that induces a calibration weld temperature. Moreover, in some implementations of the method 800, sweeping at 802 electrical current through the induction welding coil includes sweeping, at 802*b*, the electrical current to a value that is less than a value of the swept electrical current that induces a welding temperature.

At 804, the method 800 includes monitoring a response of the material to the swept electrical current using at least one EMF sensor. In some implementations, monitoring at 804 the response of the material to the swept electrical current using the at least one EMF sensor includes measuring, at 804*a*, a field intensity of the swept electrical current. In some implementations of the method 800 monitoring at 804 the response of the material to the swept electrical current using the at least one EMF sensor includes determining, at 804*b*, a field intensity to current response of the material to the swept electrical current.

At 806, the method 800 includes calibrating an electrical current value for the induction welding operation using the monitored response. Calibrating at 806 the electrical current value for the induction welding operation using the monitored response includes at least one of: selecting, at 806*a*, a value that is expected to induce a target welding temperature; or adjusting, at 806*b*, an established value such that the adjusted established value is expected to induce the target welding temperature. In some implementations, calibrating at 806 the electrical current value for the induction welding operation using the monitored response includes extrapolating, at 806*c*, a trend line of the monitored response of the material.

In some implementations, calibrating at 806 the electrical current value for the induction welding operation using the monitored response includes comparing, at 806*d*, the monitored response of the material to at least one established response of a different batch of the material. Moreover, in some implementations, calibrating at 806 the electrical current value for the induction welding operation using the monitored response includes comparing, at 806*e*, the monitored response of the material to a database that includes a plurality of established responses of different batches of the material. In some implementations of the method 800, calibrating at 806 the electrical current value for the induction welding operation using the monitored response includes: comparing, at 806*f*, the monitored response of the material to at least one trend line that represents an established field intensity to current response; and determining, at 806*g*, an offset of the monitored response of the material from the at least one trend line.

At 808, the method 800 includes performing the induction welding operation along the weld path using the calibrated electrical current value. In some implementations, performing at 808 the induction welding operation along the weld path using the calibrated electrical current value includes adjusting, at 808*a*, the electrical current value for the induction welding operation in real time as the induction welding coil moves along the weld path. Moreover, in some implementations of the method 800, performing at 808 the induction welding operation along the weld path using the calibrated electrical current value includes: measuring, at 808*b*, a temperature of the material at different locations along the weld path during the induction welding operation; and adjusting, at 808*c*, the electrical current value for the induction welding operation based on the measured temperatures.

In some implementations, the method 800 further includes building, at 810, a database of established responses of the same configuration but different batches of the material.

Figure 9:
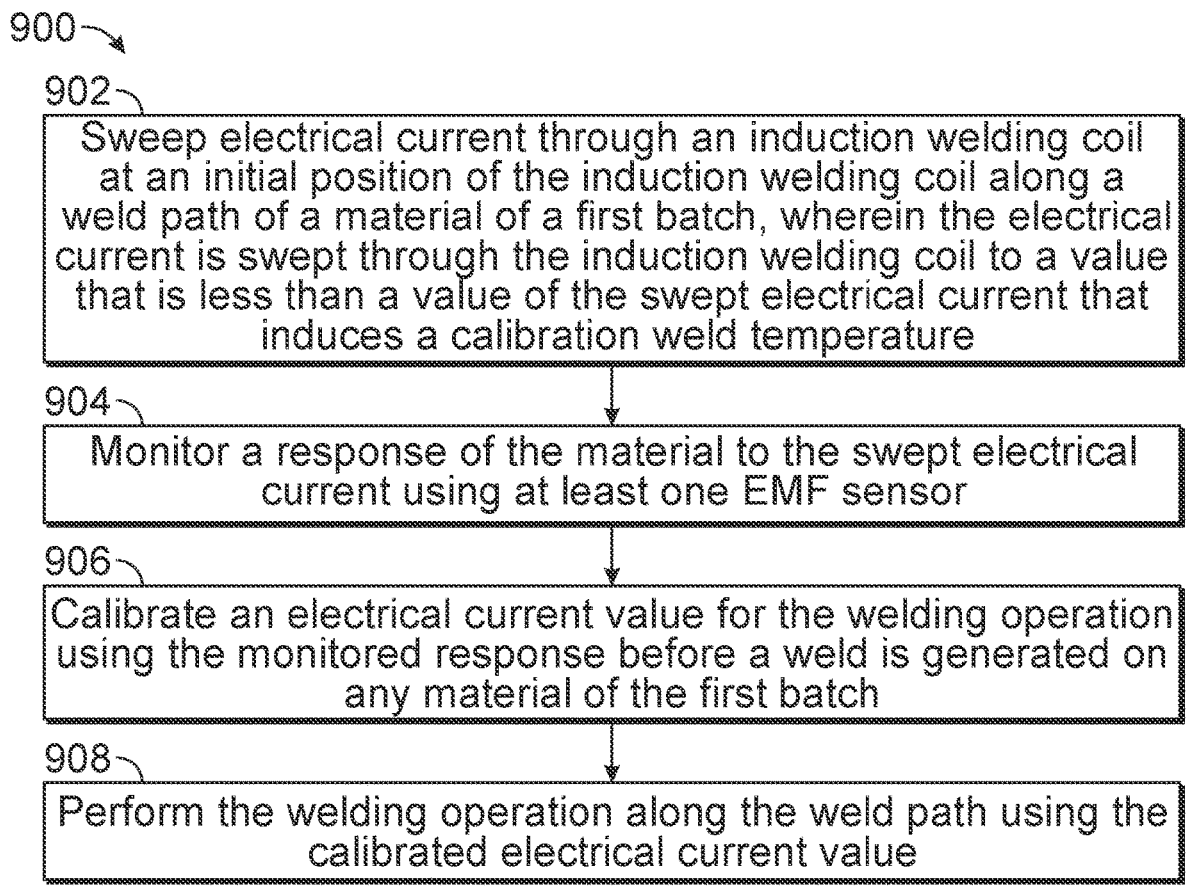
FIG. 9 is a flow chart illustrating a method for controlling an induction welding operation, in accordance with an implementation.

FIG. 9 is a flow chart illustrating a method 900 for controlling an induction welding operation according to an implementation. The method 900 can be implemented by any induction welding system, such as, but not limited to, the induction welding system 100 illustrated in FIG. 1, and/or the like. Although described herein as a series of steps, additional steps can be performed, steps can be removed, or steps can be performed in a different order without departing from the scope of the present disclosure. The method 900 may be performed manually by a human operator, semi-autonomously using both a computing device and a human operator, or fully autonomously using a computing device. For example, in some implementations the steps illustrated in FIG. 9 are performed, at least in part, by a computing device such as, but not limited to, the controller 104 shown in FIG. 1, the computing device 1000 shown in FIG. 10, and/or the like. Various implementations of the method 900 can be performed without departing from the scope of the present disclosure.

The method 900 includes sweeping, at 902, electrical current through an induction welding coil at an initial position of the induction welding coil along a weld path of a material of a first batch, wherein the electrical current is swept through the induction welding coil to a value that is less than a value of the swept electrical current that induces a calibration weld temperature. At 904, the method 900 includes monitoring a response of the material to the swept electrical current using at least one EMF sensor. The method 900 includes calibrating, at 906, an electrical current value for the induction welding operation using the monitored response before a weld is generated on any material of the first batch. At 908, the method 900 includes performing the induction welding operation along the weld path using the calibrated electrical current value.

Figure 10:
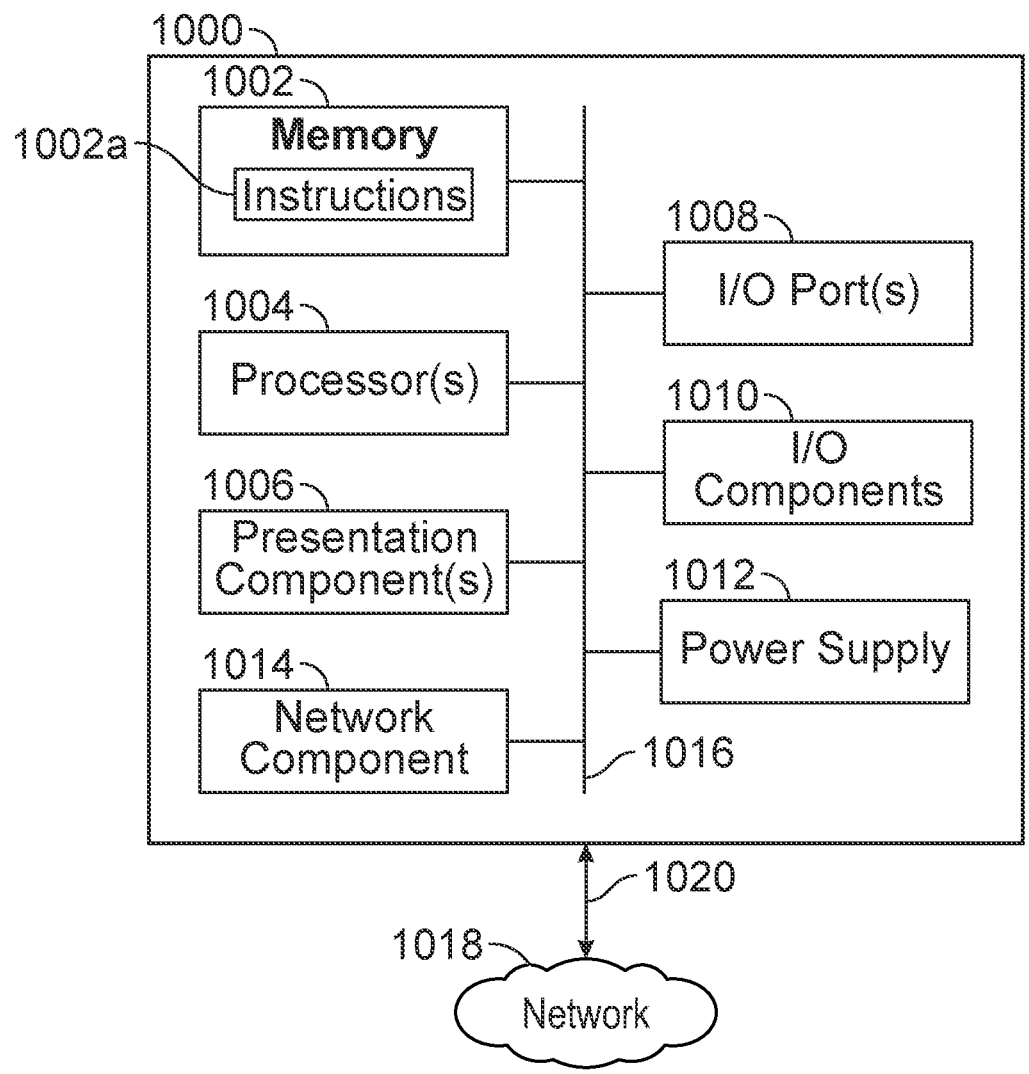
FIG. 10 is a block diagram of a computing device suitable for implementing various implementations of the disclosure, in accordance with an implementation.

With reference now to FIG. 10, a block diagram of the computing device 1000 suitable for implementing various implementations of the disclosure is described. In some implementations, the computing device 1000 includes one or more processors 1004, one or more presentation components 1006 and the memory 1002. The disclosed implementations associated with the computing device 1000 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 10 and the references herein to a "computing device." The disclosed implementations are also practiced in distributed computing environments, where tasks are performed by remote-processing devices that are linked through a communications network. Further, while the computing device 1000 is depicted as a seemingly single device, in one example, multiple computing devices work together and share the depicted device resources. For instance, in one implementation, the memory 1002 is distributed across multiple devices, the processor(s) 1004 provided are housed on different devices, and so on.

In one implementation, the memory 1002 includes any of the computer-readable media discussed herein. In one example, the memory 1002 is used to store and access instructions 1002*a* configured to carry out the various operations disclosed herein. In some implementations, the memory 1002 includes computer storage media in the form of volatile and/or nonvolatile memory, removable or non-removable memory, data disks in virtual environments, or a combination thereof. In one implementation, the processor(s) 1004 includes any quantity of processing units that read data from various entities, such as the memory 1002 or input/output (I/O) components 1010. Specifically, the processor(s) 1004 are programmed to execute computer-executable instructions for implementing aspects of the disclosure. In one implementation, the instructions are performed by the processor, by multiple processors within the computing device 1000, or by a processor external to the computing device 1000. In some implementations, the processor(s) 1004 are programmed to execute instructions such as those illustrated in the flowcharts discussed below and depicted in the accompanying drawings.

The presentation component(s) 1006 present data indications to an operator or to another device. In one implementation, presentation components 1006 include a display device, speaker, printing component, vibrating component, etc. One skilled in the art will understand and appreciate that computer data is presented in a number of ways, such as visually in a graphical user interface (GUI), audibly through speakers, wirelessly between the computing device 1000, across a wired connection, or in other ways. In one implementation, presentation component(s) 1006 are not used when processes and operations are sufficiently automated that a need for human interaction is lessened or not needed. I/O ports 1008 allow the computing device 1000 to be logically coupled to other devices including the I/O components 1010, some of which is built in. Implementations of the I/O components 1010 include, for example but without limitation, a microphone, keyboard, mouse, joystick, game pad, satellite dish, scanner, printer, wireless device, etc.

The computing device 1000 includes a bus 1016 that directly or indirectly couples the following devices: the memory 1002, the one or more processors 1004, the one or more presentation components 1006, the input/output (I/O) ports 1008, the I/O components 1010, a power supply 1012, and a network component 1014. The computing device 1000 should not be interpreted as having any dependency or requirement related to any single component or combination of components illustrated therein. The bus 1016 represents one or more busses (such as an address bus, data bus, or a combination thereof). Although the various blocks of FIG. 10 are shown with lines for the sake of clarity, some implementations blur functionality over various different components described herein.

In some implementations, the computing device 1000 is communicatively coupled to a network 1018 using the network component 1014. In some implementations, the network component 1014 includes a network interface card and/or computer-executable instructions (e.g., a driver) for operating the network interface card. In one implementation, communication between the computing device 1000 and other devices occur using any protocol or mechanism over a wired or wireless connection 1020. In some implementations, the network component 1014 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 1000, implementations of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one implementation, the computer-executable instructions are organized into one or more computer-executable components or modules. Generally, program modules include, but are not limited to, routines, programs, objects, components, and data structures that perform particular tasks or implement particular abstract data types. In one implementation, implementations of the disclosure are implemented with any number and organization of such components or modules. For example, implementations of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, implementations of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, program code, or the like. Computer storage media are tangible and mutually exclusive to communication media. Computer storage media are implemented in hardware and exclude carrier waves and propagated signals. Computer storage media for purposes of this disclosure are not signals per se. In one implementation, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, program code, or the like in a modulated data signal such as a carrier wave or other transport mechanism and include any information delivery media.

Figure 11:
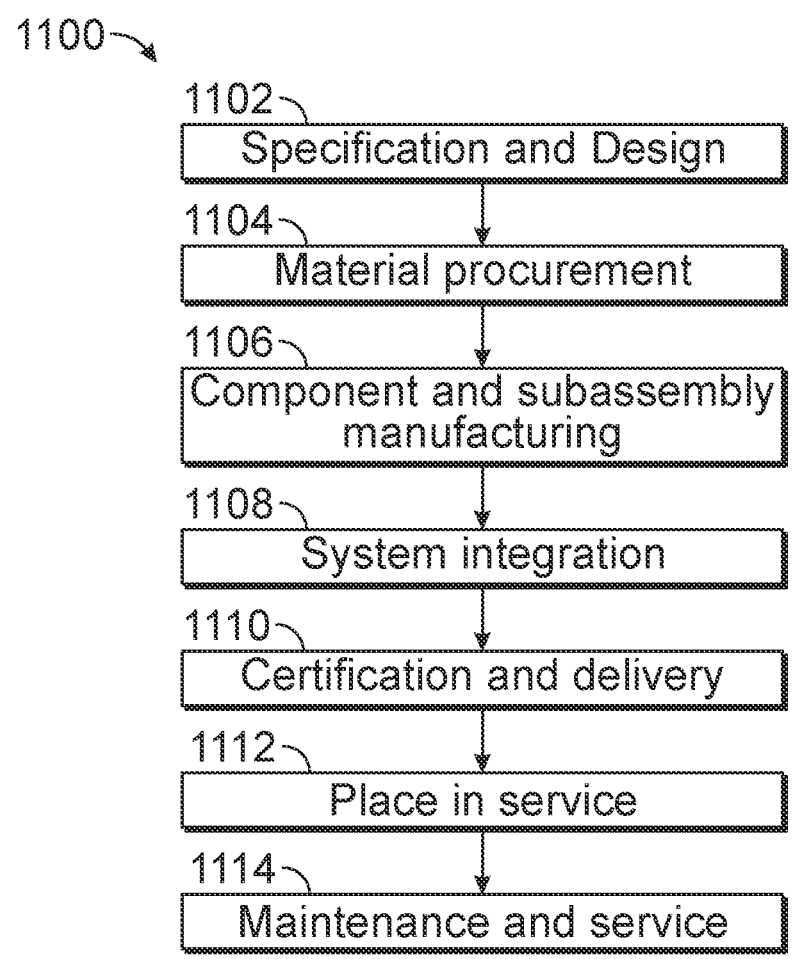
FIG. 11 illustrates a block diagram of an aircraft production and service methodology, in accordance with an implementation.
Figure 12:
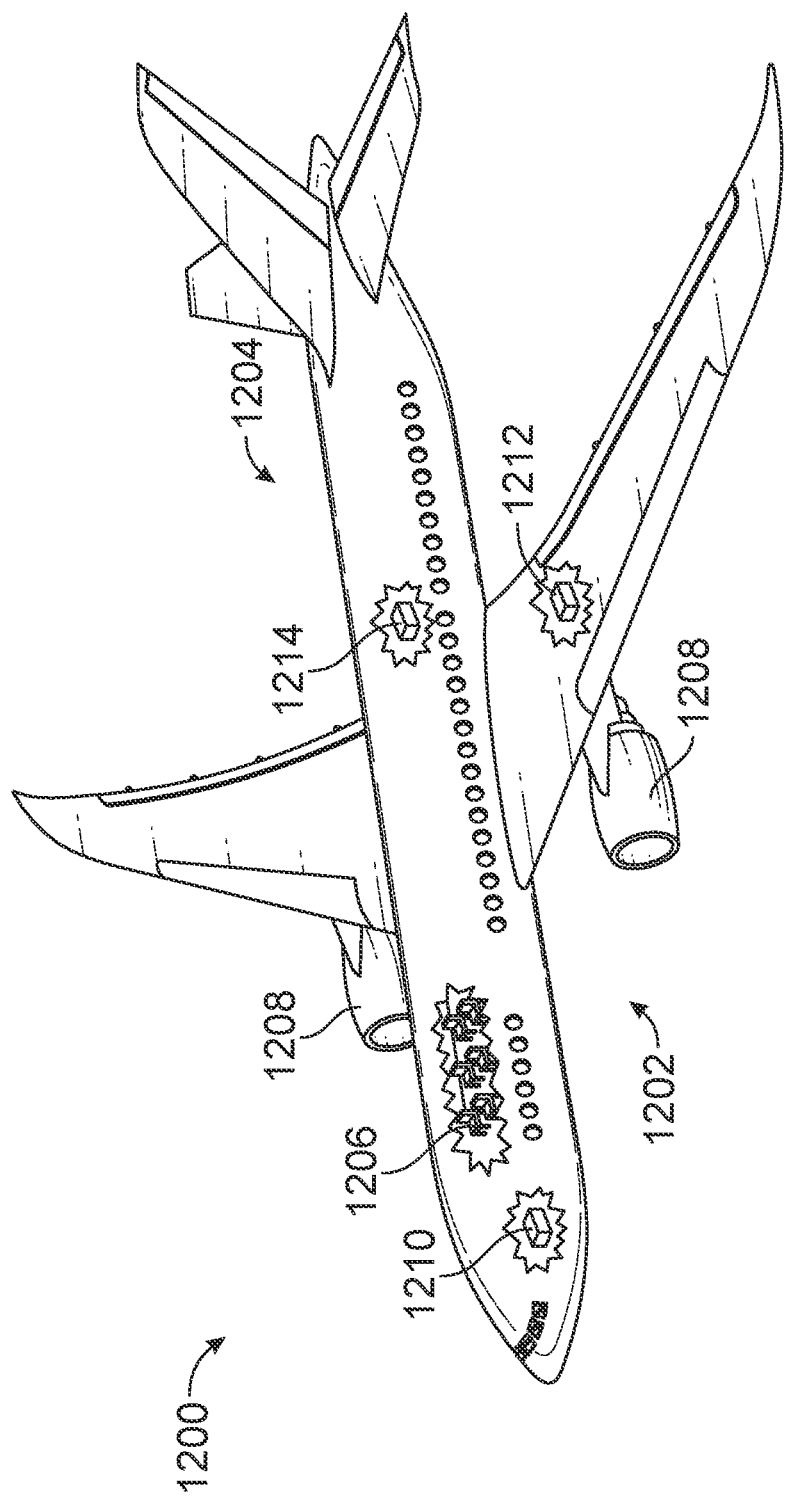
FIG. 12 illustrates a schematic perspective view of an aircraft, in accordance with an implementation.

Some implementations of the disclosure are used in manufacturing and service applications, for example as shown and described in relation to FIGS. 11 and 12. In one example, the methods, process flows, apparatus, computing devices, controllers, and/or the like disclosed herein can be used to perform the operations 1106 and/or 1108 described below, for example to produce and/or maintain the aircraft 1200 shown in FIG. 12. Moreover, and for example, implementations of the disclosure are described in the context of an apparatus manufacturing and service method 1100 shown in FIG. 11 and the aircraft 1200 shown in FIG. 12. In FIG. 11, a diagram illustrating an apparatus manufacturing and service method 1100 is depicted in accordance with an implementation. In one implementation, during pre-production, the apparatus manufacturing and service method 1100 includes specification and design 1102 of the aircraft 1200 in FIG. 12 and material procurement 1104. During production, component, and subassembly manufacturing 1106 and system integration 1108 of the aircraft 1200 in FIG. 12 takes place. Thereafter, the aircraft 1200 in FIG. 12 goes through certification and delivery 1110 in order to be placed in service 1112. While in service by a customer, the aircraft 1200 in FIG. 12 is scheduled for routine maintenance and service 1114, which, in one example, includes modification, reconfiguration, refurbishment, and other maintenance or service subject to configuration management, described herein.

In one implementation, each of the processes of the apparatus manufacturing and service method 1100 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 12, the exemplary aircraft 1200 is depicted in which an implementation of the disclosure is advantageously employed. In this implementation, the aircraft 1200 is produced by the apparatus manufacturing and service method 1100 in FIG. 11 and includes an airframe 1202, a plurality of systems 1204, and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries.

The implementations disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed implementations are practiced in a variety of system configurations, including personal computers, laptops, smart phones, mobile tablets, hand-held devices, consumer electronics, specialty computing devices, etc. The disclosed implementations are also practiced in distributed computing environments, where tasks are performed by remote-processing devices that are linked through a communications network. At least a portion of the functionality of the various elements in the figures can be performed by other elements in the figures, or an entity (e.g., processor, web service, server, application program, computing device, etc.) not shown in the figures.

The following clauses describe further aspects of the present discourse. In some implementations, the clauses described below can be further combined in any subcombination without departing from the scope of the present disclosure.

Clause Set A:

A1. A method for controlling an induction welding operation, the method comprising:
  sweeping electrical current through an induction welding coil at an initial position of the induction welding coil along a weld path of a material;
  monitoring a response of the material to the swept electrical current using at least one electromagnetic field (EMF) sensor;
  calibrating an electrical current value for the induction welding operation using the monitored response; and
  performing the induction welding operation along the weld path using the calibrated electrical current value.

A2. The method of any preceding clause, wherein sweeping electrical current through the induction welding coil comprises sweeping electrical current from zero to a value that is less than a value of the swept electrical current that induces a calibration weld temperature.

A3. The method of any preceding clause, wherein sweeping electrical current through the induction welding coil comprises sweeping the electrical current to a value that is less than a value of the swept electrical current that induces a welding temperature.

A4. The method of any preceding clause, wherein monitoring the response of the material to the swept electrical current using the at least one EMF sensor comprises measuring a field intensity of the swept electrical current.

A5. The method of any preceding clause, wherein monitoring the response of the material to the swept electrical current using the at least one EMF sensor comprises determining a field intensity to current response of the material to the swept electrical current.

A6. The method of any preceding clause, wherein calibrating the electrical current value for the induction welding operation using the monitored response comprises at least one of:
  selecting a value that is expected to induce a target welding temperature; or
  adjusting an established value such that the adjusted established value is expected to induce the target welding temperature.

A7. The method of any preceding clause, wherein calibrating the electrical current value for the induction welding operation using the monitored response comprises extrapolating a trend line of the monitored response of the material.

A8. The method of any preceding clause, wherein calibrating the electrical current value for the induction welding operation using the monitored response comprises comparing the monitored response of the material to at least one established response of a different batch of the material.

A9. The method of any preceding clause, wherein calibrating the electrical current value for the induction welding operation using the monitored response comprises comparing the monitored response of the material to a database that includes a plurality of established responses of different batches of the material.

A10. The method of any preceding clause, wherein calibrating the electrical current value for the induction welding operation using the monitored response comprises:
  comparing the monitored response of the material to at least one trend line that represents an established current and/or temperature verses field intensity loss response; and
  determining an offset of the monitored response of the material from the at least one trend line.

A11. The method of any preceding clause, wherein performing the induction welding operation along the weld path using the calibrated electrical current value comprises adjusting the electrical current value for the induction welding operation in real time as the induction welding coil moves along the weld path.

A12. The method of any preceding clause, wherein performing the induction welding operation along the weld path using the calibrated electrical current value comprises:
  measuring a temperature of the material at different locations along the weld path during the induction welding operation; and adjusting the electrical current value for the induction welding operation based on the measured temperatures.

A13. The method of any preceding clause, further comprising building a database of established responses of the same configuration but different batches of the material.

A14. The method of any preceding clause, wherein the material comprises a composite material that includes a matrix of thermoplastic reinforced by fibers.

A15. A portion of an aircraft assembled according to the method of any preceding clause.

Clause Set B:

B1. A computer program product, comprising a computer storage medium having a computer readable program code embodied therein, the computer readable program code adapted to be executed, to implement a method for controlling induction welding, the method comprising:
  sweeping electrical current through an induction welding coil at an initial position of the induction welding coil along a weld path of a material;
  monitoring a response of the material to the swept electrical current using at least one electromagnetic field (EMF) sensor;
  calibrating an electrical current value for the induction welding operation using the monitored response; and
  performing the induction welding operation along the weld path using the calibrated electrical current value.

B2. The computer program product of any preceding clause, wherein sweeping electrical current through the induction welding coil comprises sweeping electrical current from zero to a value that is less than a value of the swept electrical current that induces a calibration weld temperature.

B3. The computer program product of any preceding clause, wherein monitoring the response of the material to the swept electrical current using the at least one EMF sensor comprises determining a field intensity to current response of the material to the swept electrical current.

B4. The computer program product of any preceding clause, wherein calibrating the electrical current value for the induction welding operation using the monitored response comprises at least one of:
  selecting a value that is expected to induce a target welding temperature; or
  adjusting an established value such that the adjusted established value is expected to induce the target welding temperature.

B5. The computer program product of any preceding clause, wherein calibrating the electrical current value for the induction welding operation using the monitored response comprises extrapolating a trend line of the monitored response of the material.

B6. The computer program product of any preceding clause, wherein calibrating the electrical current value for the induction welding operation using the monitored response comprises comparing the monitored response of the material to a database that includes a plurality of established responses of different batches of the material.

B7. The computer program product of any preceding clause, wherein calibrating the electrical current value for the induction welding operation using the monitored response comprises:
  comparing the monitored response of the material to at least one trend line that represents an established current and/or temperature verses field intensity loss response; and
  determining an offset of the monitored response of the material from the at least one trend line.

B8. The computer program product of any preceding clause, wherein performing the induction welding operation along the weld path using the calibrated electrical current value comprises adjusting the electrical current value for the induction welding operation in real time as the induction welding coil moves along the weld path.

B9. The computer program product of any preceding clause, wherein performing the induction welding operation along the weld path using the calibrated electrical current value comprises:
  measuring a temperature of the material at different locations along the weld path during the induction welding operation; and
  adjusting the electrical current value for the induction welding operation based on the measured temperatures.

B10. The computer program product of any preceding clause, further comprising building a database of established responses of the same configuration but different batches of the material.

B11. A portion of an aircraft assembled according to the method of the computer program product of any preceding clause.

Clause Set C:

C1. An apparatus for induction welding, the apparatus comprising:
  an end effector comprising an induction welding coil that generates a magnetic field, the magnetic field causing a weld path of a material to generate heat resulting in induction welding;
  an electromagnetic field (EMF) sensor that measures a magnetic field intensity at an initial position of the induction welding coil along the weld path of the material; and
  a controller configured to:
    sweep electrical current through the induction welding coil at the initial position of the induction welding coil along the weld path;
    monitor a response of the material to the swept electrical current using the EMF sensor; and
    calibrate an electrical current value for the induction welding operation using the monitored response.

C2. The apparatus of any preceding clause, wherein the controller is configured to sweep electrical current through the induction welding coil from zero to a value that is less than a value of the swept electrical current that induces a calibration weld temperature.

C3. The apparatus of any preceding clause, wherein the controller is configured to monitor the response of the material to the swept electrical current by determining a field intensity to current response of the material to the swept electrical current.

C4. The apparatus of any preceding clause, wherein the controller is configured to calibrate the electrical current value for the induction welding operation using the monitored response by at least one of:
 selecting a value that is expected to induce a target welding temperature; or
 adjusting an established value such that the adjusted established value is expected to induce the target welding temperature.

C5. The apparatus of any preceding clause, wherein the controller is configured to monitor the response of the material to the swept electrical current by extrapolating a trend line of the monitored response of the material.

C6. The apparatus of any preceding clause, wherein the controller is configured to calibrate the electrical current value for the induction welding operation using the monitored response by comparing the monitored response of the material to a database that includes a plurality of established responses of different batches of the material.

C7. The apparatus of any preceding clause, wherein the controller is configured to calibrate the electrical current value for the induction welding operation using the monitored response by:
 comparing the monitored response of the material to at least one trend line that represents an established current and/or temperature verses field intensity loss response; and
 determining an offset of the monitored response of the material from the at least one trend line.

C8. The apparatus of any preceding clause, wherein the controller is further configured to adjust the electrical current value for the induction welding operation in real time as the induction welding coil moves along the weld path during the induction welding operation.

C9. The apparatus of any preceding clause, wherein the controller is further configured to:
 measure a temperature of the material at different locations along the weld path during the induction welding operation; and
 adjust the electrical current value for the induction welding operation based on the measured temperatures.

C10. A method comprising fabricating a portion of an aircraft using the apparatus of any preceding clause.

Clause Set D:

D1. A method for controlling an induction welding operation, the method comprising:
 sweeping electrical current through an induction welding coil at an initial position of the induction welding coil along a weld path of a material of a first batch, wherein the electrical current is swept through the induction welding coil to a value that is less than a value of the swept electrical current that induces a calibration weld temperature;
 monitoring a response of the material to the swept electrical current using at least one electromagnetic field (EMF) sensor;
 calibrating an electrical current value for the induction welding operation using the monitored response before a weld is generated on any material of the first batch; and
 performing the induction welding operation along the weld path using the calibrated electrical current value.

D2. A portion of an aircraft assembled according to the method of any preceding claim.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one implementation or can relate to several implementations. The implementations are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects and implementations of the disclosure.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Further, references to "one implementation" are not intended to be interpreted as excluding the existence of additional implementations that also incorporate the recited features. The term "exemplary" is intended to mean "an example of".

When introducing elements of aspects and implementations of the disclosure or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of" will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the disclosure without departing from their scope. While the dimensions and types of materials described herein are intended to define the parameters of the various implementations of the disclosure, the implementations are by no means limiting and are example implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for controlling an induction welding operation, the method comprising:
    sweeping electrical current through an induction welding coil at an initial position of the induction welding coil along a weld path of a material prior to any induction welding;
    monitoring a response of the material to the swept electrical current using at least one electromagnetic field (EMF) sensor;
    calibrating an electrical current value for the induction welding operation using the monitored response; and
    performing the induction welding operation along the weld path using the calibrated electrical current value.

2. The method of claim 1, wherein sweeping electrical current through the induction welding coil comprises sweeping electrical current from zero to a value that is less than a value of the swept electrical current that induces a calibration weld temperature.

3. The method of claim 1, wherein sweeping electrical current through the induction welding coil comprises sweeping the electrical current to a value that is less than a value of the swept electrical current that induces a welding temperature.

4. The method of claim 1, wherein monitoring the response of the material to the swept electrical current using the at least one EMF sensor comprises measuring a field intensity of the swept electrical current.

5. The method of claim 1, wherein monitoring the response of the material to the swept electrical current using the at least one EMF sensor comprises determining a field intensity to current response of the material to the swept electrical current.

6. The method of claim 1, wherein calibrating the electrical current value for the induction welding operation using the monitored response comprises at least one of:
selecting a value that is expected to induce a target welding temperature; or
adjusting an established value such that the adjusted established value is expected to induce the target welding temperature.

7. The method of claim 1, wherein calibrating the electrical current value for the induction welding operation using the monitored response comprises extrapolating a trend line of the monitored response of the material.

8. The method of claim 1, wherein calibrating the electrical current value for the induction welding operation using the monitored response comprises comparing the monitored response of the material to at least one established response of a different batch of the material.

9. The method of claim 1, wherein calibrating the electrical current value for the induction welding operation using the monitored response comprises comparing the monitored response of the material to a database that includes a plurality of established responses of different batches of the material.

10. The method of claim 1, wherein calibrating the electrical current value for the induction welding operation using the monitored response comprises:
comparing the monitored response of the material to at least one trend line that represents an established current and/or temperature verses field intensity loss response; and
determining an offset of the monitored response of the material from the at least one trend line.

11. The method of claim 1, wherein performing the induction welding operation along the weld path using the calibrated electrical current value comprises adjusting the electrical current value for the induction welding operation in real time as the induction welding coil moves along the weld path.

12. The method of claim 1, wherein performing the induction welding operation along the weld path using the calibrated electrical current value comprises:
measuring a temperature of the material at different locations along the weld path during the induction welding operation; and
adjusting the electrical current value for the induction welding operation based on the measured temperatures.

13. The method of claim 1, further comprising building a database of established responses of the same configuration but different batches of the material.

14. The method of claim 1, wherein the material comprises a composite material that includes a matrix of thermoplastic reinforced by fibers.

15. A portion of an aircraft assembled according to the method of claim 1.

16. A computer program product, comprising a non-transitory computer storage medium having a computer readable program code embodied therein, the computer readable program code adapted to be executed, to implement a method for controlling induction welding, the method comprising:
sweeping electrical current through an induction welding coil at an initial position of the induction welding coil along a weld path of a material prior to any induction welding;
monitoring a response of the material to the swept electrical current using at least one electromagnetic field (EMF) sensor;
calibrating an electrical current value for the induction welding operation using the monitored response; and
performing the induction welding operation along the weld path using the calibrated electrical current value.

17. The computer program product of claim 16, wherein sweeping electrical current through the induction welding coil comprises sweeping electrical current from zero to a value that is less than a value of the swept electrical current that induces a calibration weld temperature.

18. The computer program product of claim 16, wherein monitoring the response of the material to the swept electrical current using the at least one EMF sensor comprises determining a field intensity to current response of the material to the swept electrical current.

19. The computer program product of claim 16, wherein calibrating the electrical current value for the induction welding operation using the monitored response comprises at least one of:
selecting a value that is expected to induce a target welding temperature; or
adjusting an established value such that the adjusted established value is expected to induce the target welding temperature.

20. The computer program product of claim 16, wherein calibrating the electrical current value for the induction welding operation using the monitored response comprises extrapolating a trend line of the monitored response of the material.

21. The computer program product of claim 16, wherein calibrating the electrical current value for the induction welding operation using the monitored response comprises comparing the monitored response of the material to a database that includes a plurality of established responses of different batches of the material.

22. The computer program product of claim 16, wherein calibrating the electrical current value for the induction welding operation using the monitored response comprises:
comparing the monitored response of the material to at least one trend line that represents an established current and/or temperature verses field intensity loss response; and
determining an offset of the monitored response of the material from the at least one trend line.

23. The computer program product of claim 16, wherein performing the induction welding operation along the weld path using the calibrated electrical current value comprises adjusting the electrical current value for the induction welding operation in real time as the induction welding coil moves along the weld path.

24. The computer program product of claim 16, wherein performing the induction welding operation along the weld path using the calibrated electrical current value comprises:

measuring a temperature of the material at different locations along the weld path during the induction welding operation; and adjusting the electrical current value for the induction welding operation based on the measured temperatures.

25. The computer program product of claim 16, further comprising building a database of established responses of the same configuration but different batches of the material.

26. A portion of an aircraft assembled according to the method of the computer program product of claim 16.

27. An apparatus for induction welding, the apparatus comprising:

an end effector comprising an induction welding coil that generates a magnetic field, the magnetic field causing a weld path of a material to generate heat resulting in induction welding;

an electromagnetic field (EMF) sensor that measures a magnetic field intensity at an initial position of the induction welding coil along the weld path of the material; and a controller configured to:

sweep electrical current through the induction welding coil at the initial position of the induction welding coil along the weld path prior to any induction welding;

monitor a response of the material to the swept electrical current using the EMF sensor; and calibrate an electrical current value for the induction welding operation using the monitored response.

28. The apparatus of claim 27, wherein the controller is configured to sweep electrical current through the induction welding coil from zero to a value that is less than a value of the swept electrical current that induces a calibration weld temperature.

29. The apparatus of claim 27, wherein the controller is configured to monitor the response of the material to the swept electrical current by determining a field intensity to current response of the material to the swept electrical current.

30. The apparatus of claim 27, wherein the controller is configured to calibrate the electrical current value for the induction welding operation using the monitored response by at least one of:

selecting a value that is expected to induce a target welding temperature; or adjusting an established value such that the adjusted established value is expected to induce the target welding temperature.

31. The apparatus of claim 27, wherein the controller is configured to monitor the response of the material to the swept electrical current by extrapolating a trend line of the monitored response of the material.

32. The apparatus of claim 27, wherein the controller is configured to calibrate the electrical current value for the induction welding operation using the monitored response by comparing the monitored response of the material to a database that includes a plurality of established responses of different batches of the material.

33. The apparatus of claim 27, wherein the controller is configured to calibrate the electrical current value for the induction welding operation using the monitored response by:

comparing the monitored response of the material to at least one trend line that represents an established current and/or temperature verses field intensity loss response; and determining an offset of the monitored response of the material from the at least one trend line.

34. The apparatus of claim 27, wherein the controller is further configured to adjust the electrical current value for the induction welding operation in real time as the induction welding coil moves along the weld path during the induction welding operation.

35. The apparatus of claim 27, wherein the controller is further configured to:

measure a temperature of the material at different locations along the weld path during the induction welding operation; and adjust the electrical current value for the induction welding operation based on the measured temperatures.

36. A method comprising fabricating a portion of an aircraft using the apparatus of claim 27.

37. A method for controlling an induction welding operation, the method comprising:

sweeping electrical current through an induction welding coil at an initial position of the induction welding coil along a weld path of a material of a first batch, wherein the electrical current is swept through the induction welding coil to a value that is less than a value of the swept electrical current that induces a calibration weld temperature;

monitoring a response of the material to the swept electrical current using at least one electromagnetic field (EMF) sensor;

calibrating an electrical current value for the induction welding operation using the monitored response before a weld is generated on any material of the first batch; and performing the induction welding operation along the weld path using the calibrated electrical current value.

38. A portion of an aircraft assembled according to the method of claim 37.

* * * * *